US009824025B2

(12) United States Patent
Takada et al.

(10) Patent No.: US 9,824,025 B2
(45) Date of Patent: Nov. 21, 2017

(54) INFORMATION PROCESSING SYSTEM, INFORMATION PROCESSING DEVICE, INFORMATION PROCESSING PROGRAM AND INFORMATION PROCESSING METHOD

(71) Applicant: FUJITSU LIMITED, Kawasaki-shi, Kanagawa (JP)

(72) Inventors: Atsushi Takada, Kawasaki (JP); Kazuo Mineno, Inagi (JP); Isamu Ooishi, Fujieda (JP); Tetsuya Sano, Fujinomiya (JP); Satoshi Hongo, Yokohama (JP); Satoshi Matsumoto, Yokohama (JP); Yasuhiko Kondo, Kawasaki (JP); Kazuhisa Hiramatsu, Tachikawa (JP); Makoto Iwadare, Sagamihara (JP)

(73) Assignee: FUJITSU LIMITED, Kawasaki (JP)

( * ) Notice: Subject to any disclaimer, the term of this patent is extended or adjusted under 35 U.S.C. 154(b) by 68 days.

(21) Appl. No.: 14/621,857

(22) Filed: Feb. 13, 2015

(65) Prior Publication Data
US 2015/0253994 A1 Sep. 10, 2015

(30) Foreign Application Priority Data
Mar. 7, 2014 (JP) ................. 2014-044968

(51) Int. Cl.
*G06F 12/08* (2016.01)
*G06F 12/109* (2016.01)
(Continued)

(52) U.S. Cl.
CPC .......... *G06F 12/109* (2013.01); *G06F 3/0611* (2013.01); *G06F 3/0647* (2013.01);
(Continued)

(58) Field of Classification Search
CPC ........ G06F 3/061; G06F 3/0643; G06F 3/068; G06F 12/08; G06F 12/0866
(Continued)

(56) References Cited

U.S. PATENT DOCUMENTS 7,136,966 B2 * 11/2006 Hetrick ............... G06F 12/0866 711/113
2012/0317366 A1 12/2012 Sato et al.
2013/0031297 A1 * 1/2013 Benhase ............. G06F 12/0868 711/103

FOREIGN PATENT DOCUMENTS

JP 2003-167781 6/2003
JP 2009-187393 A 8/2009
(Continued)

OTHER PUBLICATIONS

Japanese Office Action dated Sep. 5, 2017 for corresponding Japanese Patent Application No. 2014-044968, with English Translation, 9 pages.

*Primary Examiner* — Gary Portka
(74) *Attorney, Agent, or Firm* — Fujitsu Patent Center

(57) ABSTRACT

An information processing system comprising a storage device and an information processing device, wherein the information processing device includes a data holding unit which holds first data, a first detection unit which detects a first state of access, and a transmission unit which transmits the first state of access detected by the first detection unit to the storage device, and the storage device includes a storage unit which stores second data, a reception unit which receives the first state of access transmitted from the transmission unit, a second detection unit which detects a second state of access, which is a state of access to the second data, and a control unit which rearranges the second data in the storage unit on the basis of the states of access.

13 Claims, 22 Drawing Sheets

(51) Int. Cl.
*G06F 12/0871* (2016.01)
*G06F 12/122* (2016.01)
*G06F 3/06* (2006.01)

(52) U.S. Cl.
CPC ............ *G06F 3/0685* (2013.01); *G06F 12/08* (2013.01); *G06F 12/0871* (2013.01); *G06F 12/122* (2013.01); *G06F 2212/217* (2013.01); *G06F 2212/305* (2013.01); *G06F 2212/657* (2013.01); *G06F 2212/7201* (2013.01)

(58) Field of Classification Search
CPC ............ G06F 12/0868; G06F 12/0871; G06F 12/0897; G06F 12/109; G06F 2212/3042; G06F 2212/305; G06F 2212/313; G06F 2212/602; G06F 2212/6024; G06F 2212/657
USPC .......................... 711/103, 113, 118, 122, 137
See application file for complete search history.

(56) References Cited

FOREIGN PATENT DOCUMENTS

| WO | 2012/058482 A1 | 5/2012 |
| WO | 2012/164671 A1 | 12/2012 |

\* cited by examiner

INFORMATION PROCESSING SYSTEM, INFORMATION PROCESSING DEVICE, INFORMATION PROCESSING PROGRAM AND INFORMATION PROCESSING METHOD

CROSS-REFERENCE TO RELATED APPLICATION

This application is based upon and claims the benefit of priority of the prior Japanese Patent Application No. 2014-044968, filed on Mar. 7, 2014, the entire contents of which are incorporated herein by reference.

FIELD

The present invention relates to an information processing system, an information processing device, an information processing program, and an information processing method.

BACKGROUND

A business system (for example, a customer management system) implements processing of large-volume data such as big data. The big data is a collection of large-scale data, and the analysis thereof can provide information useful for the business.

When large-volume data such as big data are analyzed, a database in each system manages large volumes of data. Business systems including databases have been technologically improved to increase the processing capacity thereof. Such technological improvement is sometimes performed, for example, for each constituent element such as an application, a storage (also referred to hereinbelow as a storage device), and a network constituting the system, provided that the constituent elements to not adversely affect each other.

For example, a storage device sometimes includes a plurality of storage units that differ in a read rate, and the storage units are controlled depending on which storage unit stores data and according to the access frequency of the data. More specifically, for example, the storage device determines the access frequency to data of each type by detecting the access to the data stored in the storage device (host device). The data with a high access frequency are then stored in a storage unit with a high read rate. Alternatively, the data with a high access frequency are transferred from a storage unit with a low read rate to a storage unit with a high read rate (see, for example, Japanese Laid-open Patent Publication No. 2003-167781). Such a technique of rearranging the data between the high-speed storage unit and low-speed storage unit according to the data access frequency (referred to hereinbelow as the "automatic hierarchization technique") increases the processing efficiency of access to the data in the storage device.

SUMMARY

For example, in an application such as a RDBMS (database management system) performing database creation and management, the data that have been read from the storage device are held in a memory carrier in the main memory such as a DRAM allocated to the application. When the data held in the memory cache are accessed, the application can use a configuration increasing the data access speed by accessing the data held in the memory cache, rather than in the storage unit.

In this case, where the data in the memory cache allocated by the application are accessed, the access to the storage device does not occur. Therefore, the storage device is not able to detect the access of the data in the memory cache. The information relating to the request to access the data from the application is not correctly reflected in the state of access of the data managed in the storage device, and the storage device sometimes is not able to adequately use the automatic hierarchization technique.

According to an aspect of the embodiments, an information processing system includes a storage device and an information processing device capable of accessing the storage device, wherein the information processing device has a data holding unit which holds first data that are read from the storage device, a first detection unit which detects a first state of access, which is a state of access to the first data, and a transmission unit which transmits the first state of access detected by the first detection unit to the storage device, and wherein the storage device has a storage unit which stores second data corresponding to the first data, a reception unit which receives the first state of access transmitted from the transmission unit, a second detection unit which detects a second state of access, which is a state of access to the second data, and a control unit which rearranges the second data in the storage unit on the basis of the first and second states of access.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

The embodiments of the present invention will be explained below with reference to the appended drawings. However, the technical scope of the present invention is not limited to those embodiments and includes the features set forth in the claims and equivalents thereof. Initially, the hardware configuration of the information processing system will be described.

[Configuration of Information Processing System]

Figure 1:
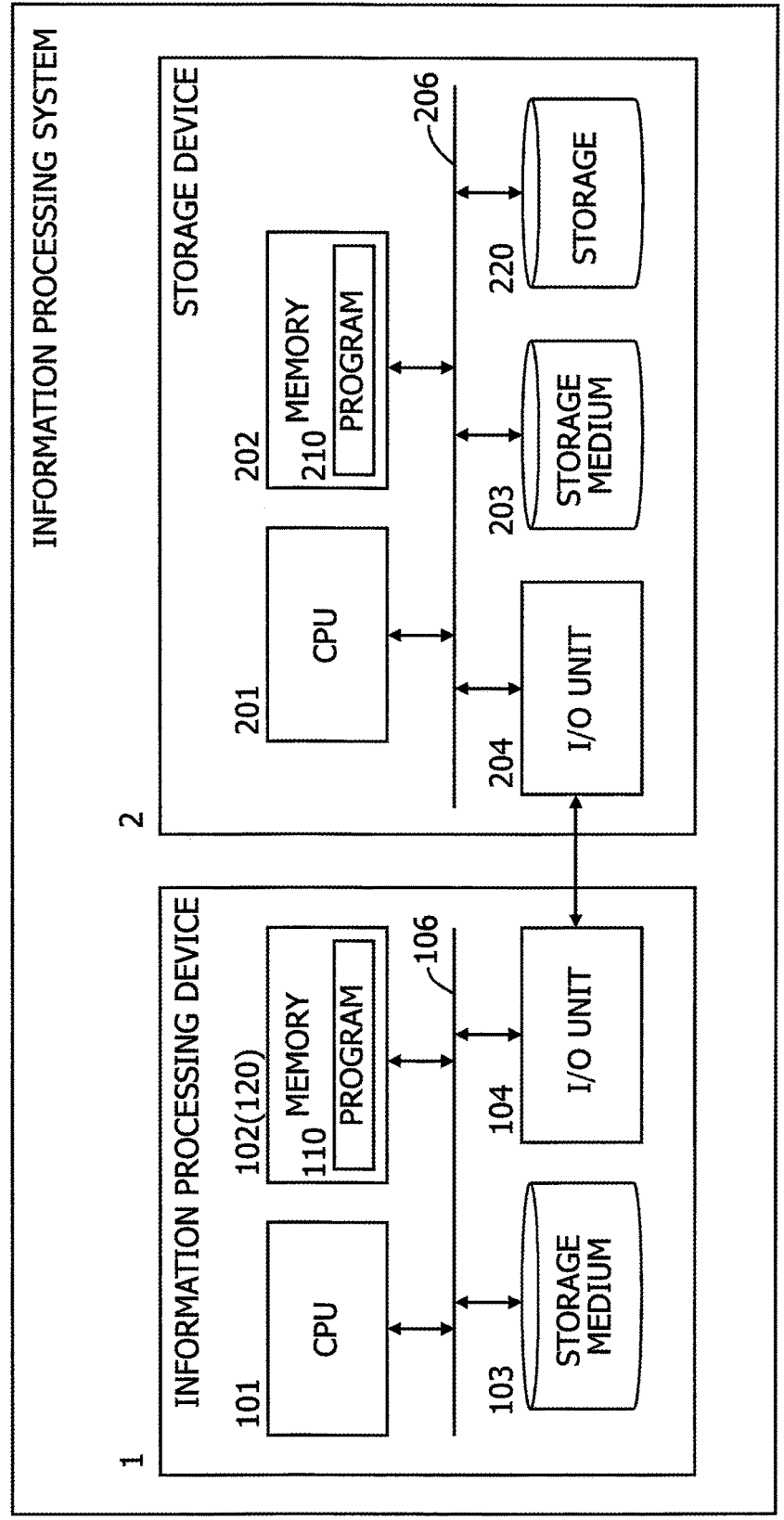
FIG. 1 illustrates the hardware configuration of the information processing system.

FIG. 1 illustrates the hardware configuration of the information processing system. The information processing system 10 has an information processing device 1 and a storage device 2. The information processing device 1 is connected to the storage device 2 and can access the storage device 2.

The information processing device 1, for example, accesses data in the storage device 2 in response to a data access request issued by an application in the information processing device 1.

For example, the storage device 2 has a hard disk drive (HDD) and a solid state drive (SSD) capable of accessing data at a rate higher than that of HDD. The storage device 2 accesses the data stored in the HDD or SSD in response to the data access request from the information processing device 1 and transmits the data to the information processing device 1.

The information processing device 1 includes a CPU (processor) 101, which is a processor, a memory 102 (main memory), a storage medium 103, and an external interface (I/O unit) 104. The units are connected to each other by a bus 106. The storage medium 103 stores, for example, a program 110 for performing the processing of accessing the storage device 2. The CPU 101 loads the program 110 to the memory 102 when the program 110 is executed, and performs the processing of accessing the data in the storage device 2 cooperatively with the program 110. The memory 102 also functions as a memory cache 120 (referred to hereinbelow also as the "data holding unit 120" or "data holding means 120", and a step of holding data in the memory cache 120 is also referred to as the "data holding step") that holds data (also referred to hereinbelow as the "first data") that have been read from the storage device 2. The memory cache 120 may be also configured to be provided in a memory separate from the memory 102.

Figure 5:
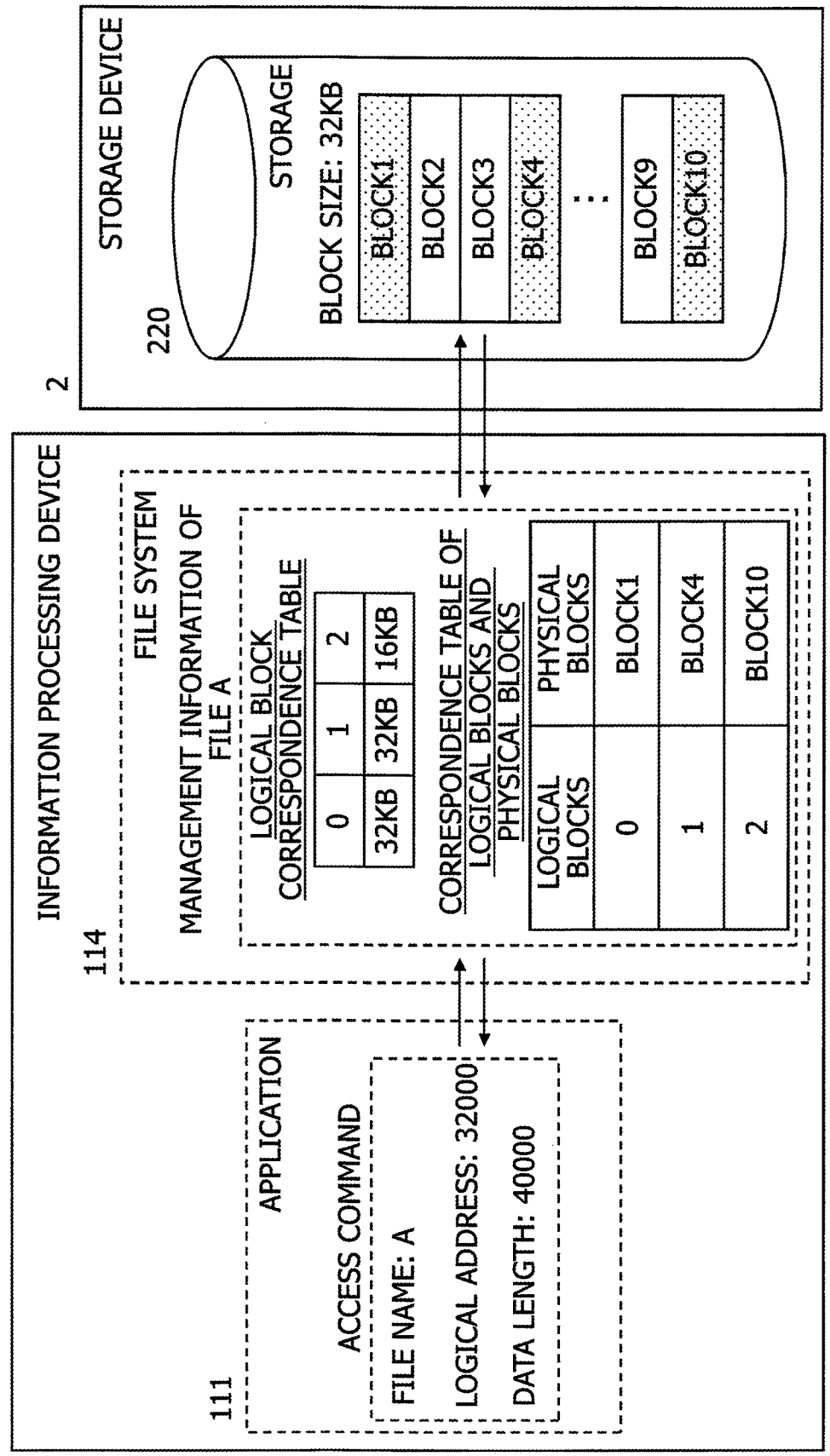
FIG. 5 illustrates the outline of data access.

The storage device 2 has a CPU (processor) 201, which is a processor, a memory 202 (main memory), a storage medium 203, an external interface (I/O unit) 204, and a storage 220 (referred to hereinbelow also as the "storage unit 220", "data storage unit 220", or "storage means 220", and a step of storing data in the storage unit 220 is also referred to as the "storage step"). The units are connected to each other by a bus 206. The storage medium 203 stores a program 210 for performing the processing of transmitting data on an access destination in response to a data access request from the information processing device 1. The CPU 201 loads the program 210 to the memory 202 when the program 210 is executed and performs, cooperatively with the program 210, the processing of accessing the data in the storage device 2 in response to the data access request issued by the information processing device 1. The data access is depicted in FIG. 5. The storage 220 stores the second data corresponding to the first data (including the first data). The storage medium 203 and the storage 220 may be configured of a single storage medium.

Figure 2:
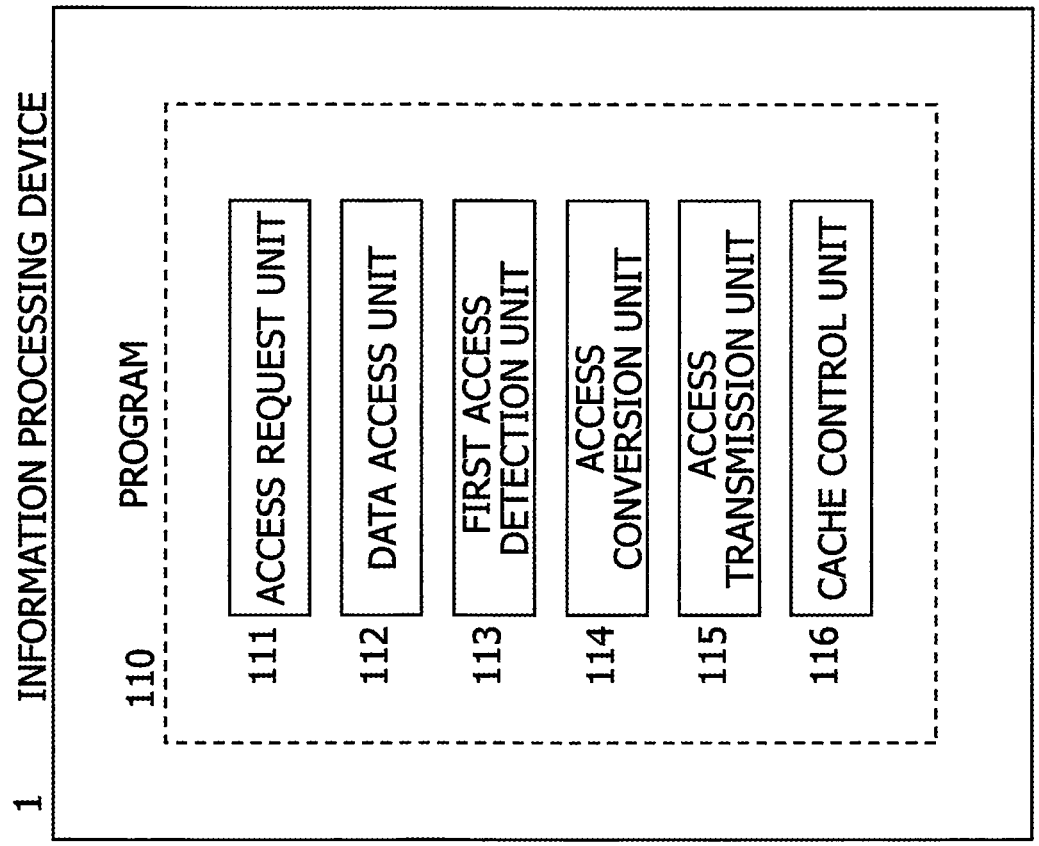
FIG. 2 is a functional block diagram of the information processing device depicted in FIG. 1.

FIG. 2 is a functional block diagram of the information processing device depicted in FIG. 1. As shown in FIG. 2, the program 110 of the information processing device 1 has, for example, a data request unit 111 (also referred to hereinbelow as the "application 111"), a data access unit 112 (also referred to hereinbelow as the "data access means 112" or "data access step 112"), a first access detection unit 113 (also referred to hereinbelow as the "first detection unit 113", "first detection means 113", or "first detection step 113"), an access conversion unit 114 (also referred to hereinbelow as the "file system 114", "address conversion means 114", or "address conversion step 114"), an access transmission unit 115 (also referred to hereinbelow as the "transmission unit 115", "transmission means 115", or "transmission step 115"), and a cache control unit 116.

The data request unit 111 issues an access command (also referred to hereinbelow as the "READ command") for accessing the first data or the second data stored in the storage device 2. The data request unit 111 also requests a data access to the data access unit 112 on the basis of the issued access command.

The data access unit 112 accesses the data holding unit 120 in response to the access request to the first data or second data when the data to be accessed are included in the first data. The data access unit 112 accesses the storage device 2 when the data to be accessed are not included in the first data.

Figure 4:
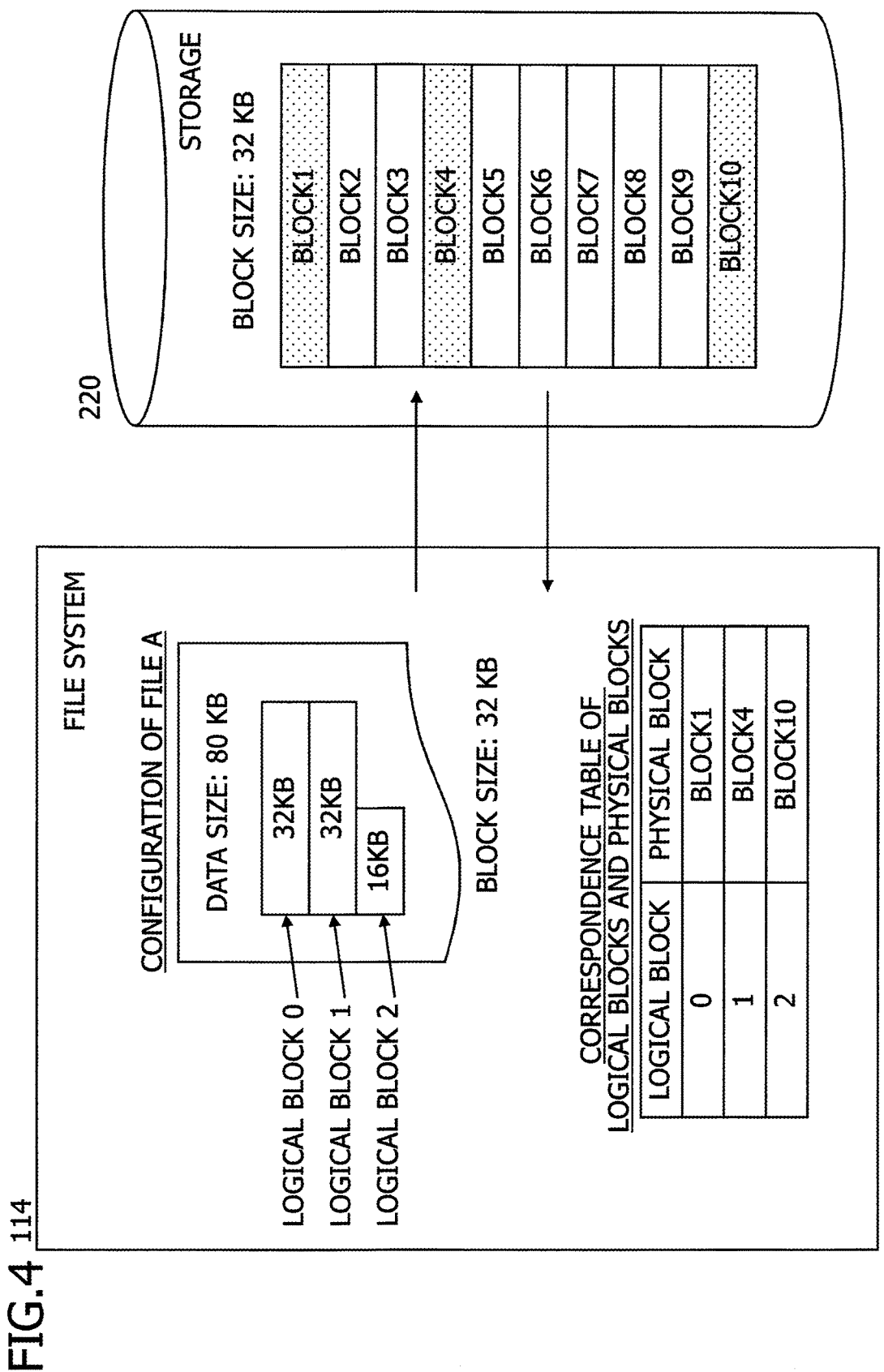
FIG. 4 illustrates the configurations of a file and a storage.

The first access detection unit 113 detects a first state of access which is a state of access to the first data in the data holding unit 120. The first state of access is depicted in FIG. 5. Further, the access conversion unit 114 converts a logical address (referred also to hereinbelow as the "storage position") of the second data into a physical block where the second data are stored, on the basis of management information managed for each file. The file configuration is depicted in FIG. 4. The address in the storage device 2 where a physical block is stored is also referred to hereinbelow as the "physical address".

The access transmission unit 115 transmits the first state of access detected by the first access detection unit 113 to the storage device 2. The cache control unit 116 performs control of holding the first data, which have been read from the storage device 2, in the memory cache 120. The cache control unit 116 also deletes data which have not been accessed for a certain period of time or the oldest data present in the memory cache 120 from the memory cache 120, for example, when the first data have been read from the storage device 2.

Figure 3:
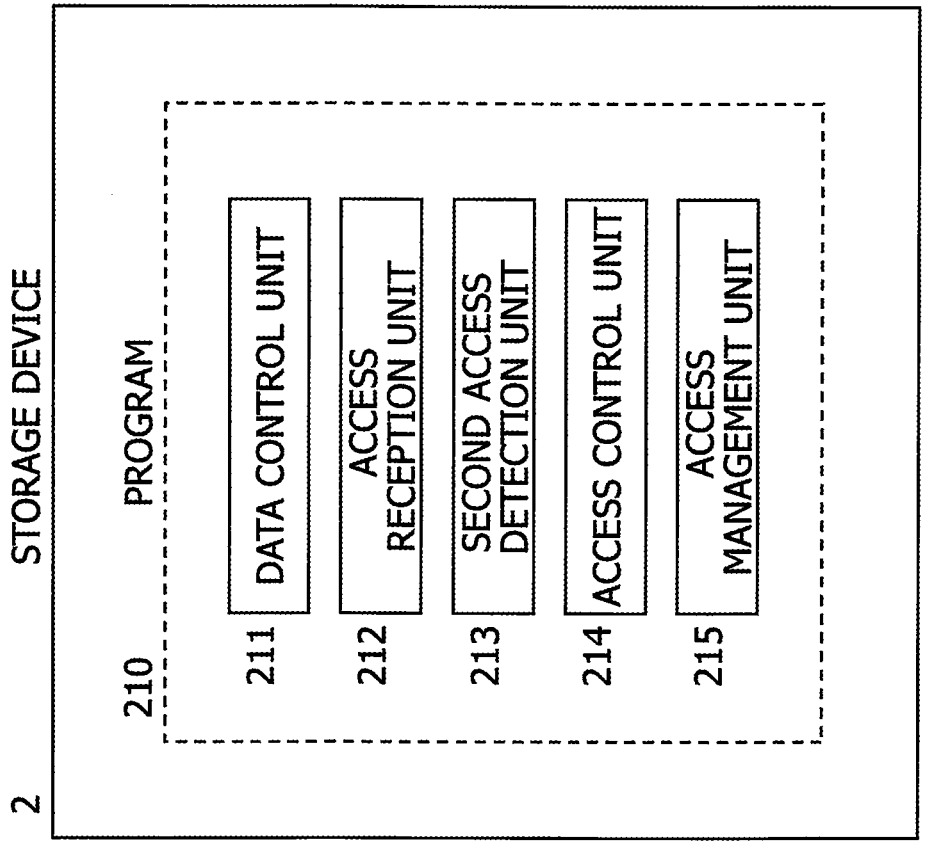
FIG. 3 is a functional block diagram of the storage device depicted in FIG. 1.

FIG. 3 is a functional block diagram of the storage device depicted in FIG. 1. As depicted in FIG. 3, the program 210 (also referred to hereinbelow, together with the program 110, as the "information processing program") of the storage device 2 has, for example, a data control unit 211, an access reception unit 212 (also referred to hereinbelow as the "reception unit 212", "reception means 212", or "reception step 212"), a second access detection unit 213 (also referred to hereinbelow as the "second detection unit 213", "second detection means 213", or "second detection step 213"), an access control unit 214 (also referred to hereinbelow as the "control unit 214", "control means 214", or "control step 214"), and an access management unit 215 (also referred to hereinbelow as the "access management means 215").

The data control unit 211 performs control of storing the second data including the first data in the data storage unit 220. Further, the access reception unit 212 receives the first state of access transmitted from the access transmission unit 115. The second access detection unit 213 detects a second state of access which is a state of access to the second data. The second state of access is depicted in FIG. 5. Further, the access control unit 214 rearranges the second data in the data storage unit 220 on the basis of the first and second states of access. Further, the access management unit 215 stores an aggregate value of the second state of access to the second data stored in a unit area and the first state of access to the first data corresponding to the second data stored in the unit area for each unit area in the data storage unit 220.

[Typical Data Access]

A typical example relating to the case in which the information processing device 1 accesses the data in the storage 220 is explained below. FIG. 4 illustrates the configurations of a file and a storage. FIG. 5 illustrates the outline of data access.

Initially, the configuration of the file of the file system 114 is explained. The file A depicted in FIG. 4 has a data length of 80 kilobyte (a byte and a kilobyte are also denoted hereinbelow as B and KB, respectively) and is one of the files managed by the file system 114. In the example depicted in FIG. 4, the block size of a block (also referred to hereinbelow as the "logical block") stored in the file is 32 KB. Therefore, the file A is divided into three logical blocks with a data length of 32 KB, 32 KB, and 16 KB to store the data. Where the block size of the logical block is made equal to the block size of the physical block which is a unit of data storage in the storage 220, the logical block can be allocated, as is, to the physical block in the storage 220.

The correspondence table of the logical blocks and physical blocks of the file system 114 is explained below. In the example depicted in FIG. 4, the correspondence table of the logical blocks and physical blocks stores the correspondence relationship between the logical blocks of the file A and the physical blocks in the storage 220 in which the data of the logical blocks are actually stored. In the example depicted in FIG. 4, the data of a logical block 0 are shown to be stored in a block 1 in the storage 220, and the data of a logical block 1 are shown to be stored in a block 4 in the storage 220. The data of a logical block 2 are shown to be stored in a block 10 in the storage 220.

A specific example of data access performed by the application 111 is explained below. In the example depicted in FIG. 5, the application 111 issues an access command including the logical address of the data that are to be accessed. The access command of the example depicted in FIG. 5 is constituted by a name of the file including the data to be accessed, a logical address indicating the position of the data, which are to be accessed, in the file, and the data length of the data to be accessed. The logical address is a virtual address in the file. In the example depicted in FIG. 5, the logical address included in the access command issued by the application 111 is 32000, and the data length is 40000.

Therefore, in the example depicted in FIG. 5, a state is shown in which the application 111 executes the access to the data stored from a position of 32000 from the header of the file A (a position of 32 KB from the header of the file A) to a position of 40000 (a position of 40 KB).

Then, the file system 114 acquires information on the physical block that stores the data, to which the application 111 executes the access, on the basis of the management information of the file. In the example depicted in FIG. 5, the file system 114 has a logical block correspondence table and the correspondence table of logical blocks and physical blocks, which has been explained in FIG. 4, as the management information of the file. The logical block correspondence table is a table in which logical addresses are associated with logical blocks. More specifically, the logical block correspondence table of the file A in FIG. 5 indicates that 32 KB from a logical address 0 (the header of the file A) to a logical address 32000 correspond to the logical block 0, and 32 KB from the logical address 32000 to a logical address 64000 correspond to the logical block 1. Further, 16 KB from the logical address 64000 to a logical address 80000 correspond to the logical block 2. In the example, depicted in FIG. 5, the access command issued by the application 111 is a command for accessing the data stored "from a position of 32 KB to a position of 40 KB from the header of the file A". Therefore, according to the logical block correspondence table, the header of data relating to the access command corresponds to the header of the logical block 1, and the end of data relating to the access command corresponds to a position of 8 KB from the header of the logical block 2.

Then, the file system 114 acquires information of the block 4 and block 10, which are the physical blocks corresponding to the logical block 1 and the logical block 2, from the correspondence table of the logical blocks and physical blocks. The data access means 112 then accesses the data which are the block 4 and the block 10 in the storage 220.

The storage 220 then transmits the data accessed by the application 111 to the application 111 through the file system 114. Data access by the application 111 is thus completed.

[Horizontal Specialization System]

A horizontal specialization system and vertical integration system are described below. In the horizontal specialization system, the development is carried out while performing optimization for each constitutive element, such as an application, a storage device, and a network, constituting the system, provided that the constitutive elements produce no effect on each other. Meanwhile, in the vertical integration system, the development is carried out while performing optimization of the entire system in a combination of constitutive elements, rather than the optimization of individual constitutive elements. Thus, in the horizontal specialization system, the development is carried out, for example, while optimizing each of the application 111, file system 114, and storage device 2 depicted in FIG. 5. In the vertical integration system, the application 111, file system 114, and storage device 2 depicted in FIG. 5 are developed while optimizing the entire system.

In the horizontal specialization system, the constitutive elements are independent, and the degree of freedom at the constitutive element development stage is high in order to minimize the effect between the constitutive elements. Further, since the degree of freedom in development is high, a large number of products are developed from each constitutive element. Therefore, the product cost tends to decrease. Another advantage is that a system developer can select a product to be used from among a large number of products.

However, when the system is created by combining the constitutive elements produced by different vendors, the system structure is complicated and the system can have poor adaptability and flexibility with respect to technological changes. Further, system creation takes a long time and can be costly. In addition, since the development vendor is different for each constitutive element, usage and maintenance of the entire system can be difficult.

Figure 6:
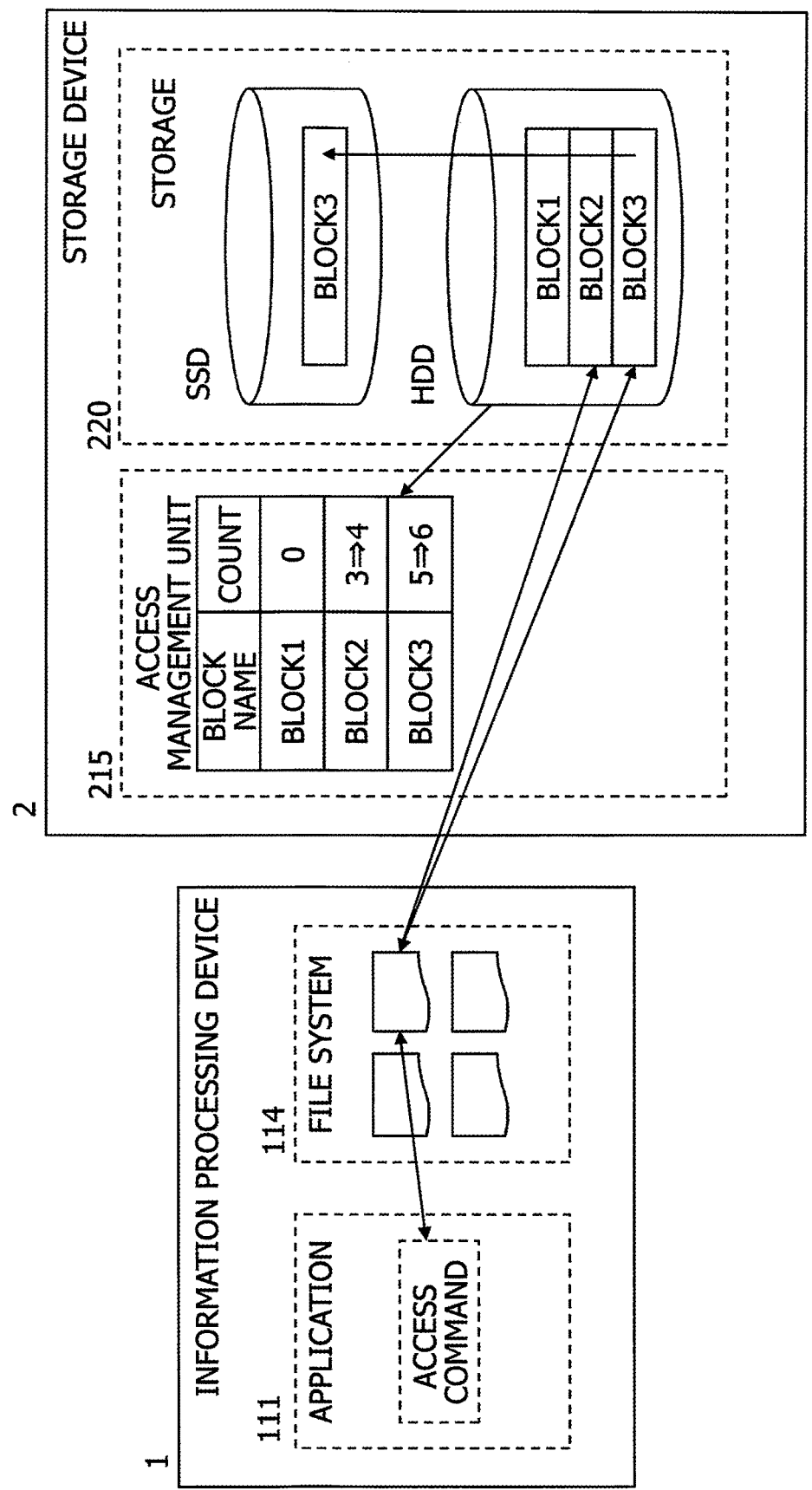
FIG. 6 illustrates the case in which the efficiency of data access is increased in the storage device 2.
Figure 7:
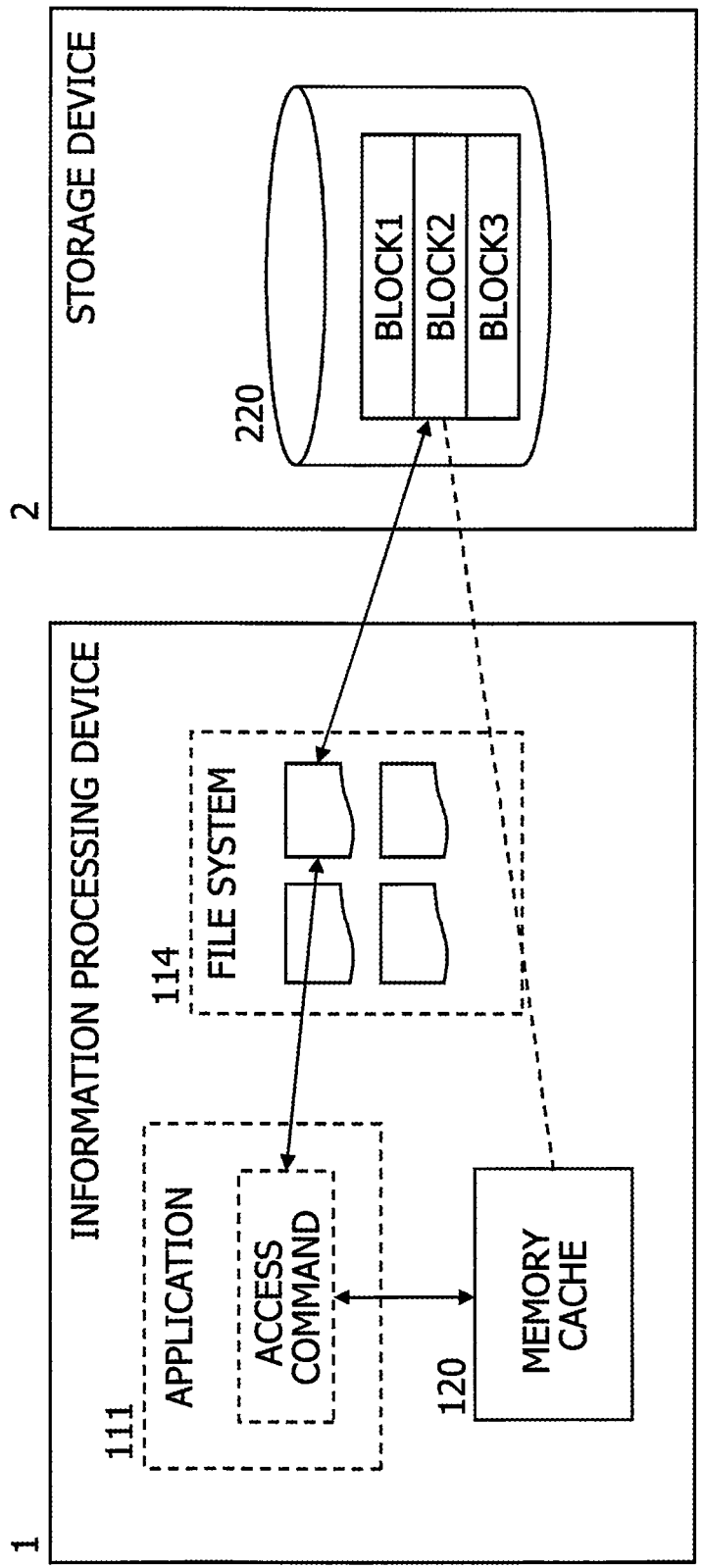
FIG. 7 illustrates the case in which the efficiency of data access is increased in the information processing device 1.

FIGS. 6 and 7 illustrate the increase in data access efficiency in the horizontal specialization system. FIG. 6 illustrates the case in which the efficiency of data access is increased in the storage device 2. FIG. 7 illustrates the case in which the efficiency of data access is increased in the information processing device 1. In the example depicted in FIG. 6, the storage device 2 has the storage 220 constituted by a HDD and a SSD, and the access management unit 215 that manages the access to the blocks in the HDD. Further, as indicated in FIG. 5, the application 111 accesses the data stored in the HDD or SSD in the storage 220 by issuing an access command to the file system 114.

In the example depicted in FIG. 6, the application 111 accesses the block 2 and the block 3 in the HDD. Then, the access management unit 215 updates the count of the block 2 in the access management unit 215 from 3 to 4 and updates the count of block 3 from 5 to 6. The storage device 2 then stores the block 3 with the largest number of accesses in the SSD on the basis of the count of the blocks in the access management unit 215. As a result, the block with the largest number of accesses can be accessed at a high speed, and the efficiency of data access from the information processing device 1 to the storage device 2 can be increased.

In the example depicted in FIG. 7, the information processing device 1 has the memory cache 120. The memory cache 120 is, for example, a storage area provided in the memory 102 shown in FIG. 1 for storing for a fixed period of time the data that have been processed when the application 111 accessed the storage device 2. More specifically, the memory cache 120 stores, for example, the data in the storage device 2 that have been accessed from the application 111. As a result, when the application 111 accesses the data stored in the memory cache 120, it is suffice to access the memory cache 120, and therefore it is not necessary to access the storage device 2. As a consequence, the application 111 can rapidly access the data stored in the memory cache 120, and the efficiency of data access from the information processing device 1 to the storage device 2 can be increased. In addition to the aforementioned RDBMS, ".NET Framework" provided by Microsoft™ is the application performing the cache processing using the memory cache 120 such as depicted in FIG. 7.

[Vertical Integration System]

Meanwhile, in the vertical integration system, the development is carried out while optimizing the entire system. The stability and reliability of the entire system are higher and the operations and usage at the time of system introduction are easier than those of the horizontal specialization system. Another merit is that an open standard technology is often used for optimizing the entire system and the application deployment and transition are facilitated. However, the degree of freedom in development is low (for example, customization is difficult), and the production cost of the constitutive elements tends to be higher than that in the horizontal specialization system. Further, since the entire system is often created by one vendor, there is often a strong dependency on the unique technology of a specific vendor.

Figure 8:
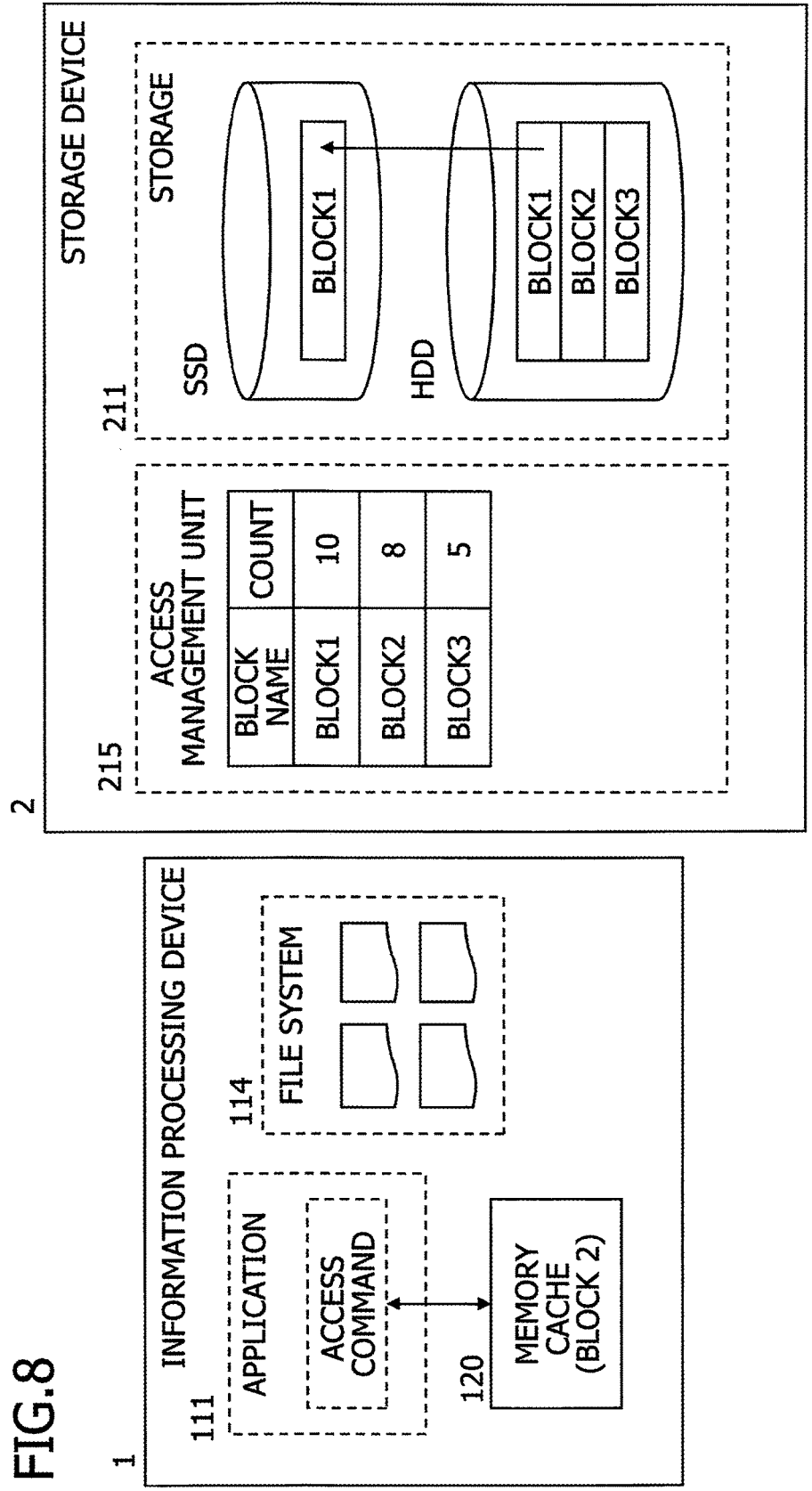
FIG. 8 illustrates the access management operation when data in a memory cache are accessed in the vertical integration system.

The case in which the increase in data access efficiency in the horizontal specialization system explained in FIGS. 6 and 7 is used in the vertical integration system is explained below. FIG. 8 illustrates the access management operation when data in a memory cache are accessed in the vertical integration system.

When the application 111 accesses the data in the memory cache 120, information relating to the data access to the memory cache 120 is not transmitted to the storage device 2. Therefore, as indicated in FIG. 8, when data (data stored in the memory cache 120) same as the data stored in the storage 220 are accessed, the count of the access management unit 215 is not updated. More specifically, in the example depicted in FIG. 8, the access management unit 215 stores 10, 8, and 5 as the count of the block 1, block 2, and block 3, respectively. In this case, the data of the block 2 of the HDD are stored in the memory cache 120, and the block 2 is assumed to be accessed 5 times from the application 111. In such a case, the number of times the data in the block 2 are accessed by the application 111 is 13 which is obtained by adding 5, which is the number of times the memory cache 120 is accessed by the application 111, to 8 which is stored by the access management unit 215. However, the access management unit 215 stores the number of times (8 times), which does not include the number of times the memory cache 120 is accessed by the application 111, as the number of times the data in the block 2 are accessed by the application 111. Therefore, the information relating to the request from the application 111 to access data is not correctly reflected in the count stored by the access management unit 215 and the abovementioned automatic hierarchization technique sometimes does not operate adequately. In the example depicted in FIG. 8, the block 1 with the largest count (10 times) is stored in the SSD.

Accordingly, in the present embodiment, the arrangement of data in the storage device 2 is controlled on the basis of the state of access to the storage device 2 and the memory cache 120 by detecting the state of access to the data held in the memory cache 120 and transmitting the detected state of access to the storage device.

[First Embodiment]

Figure 9:
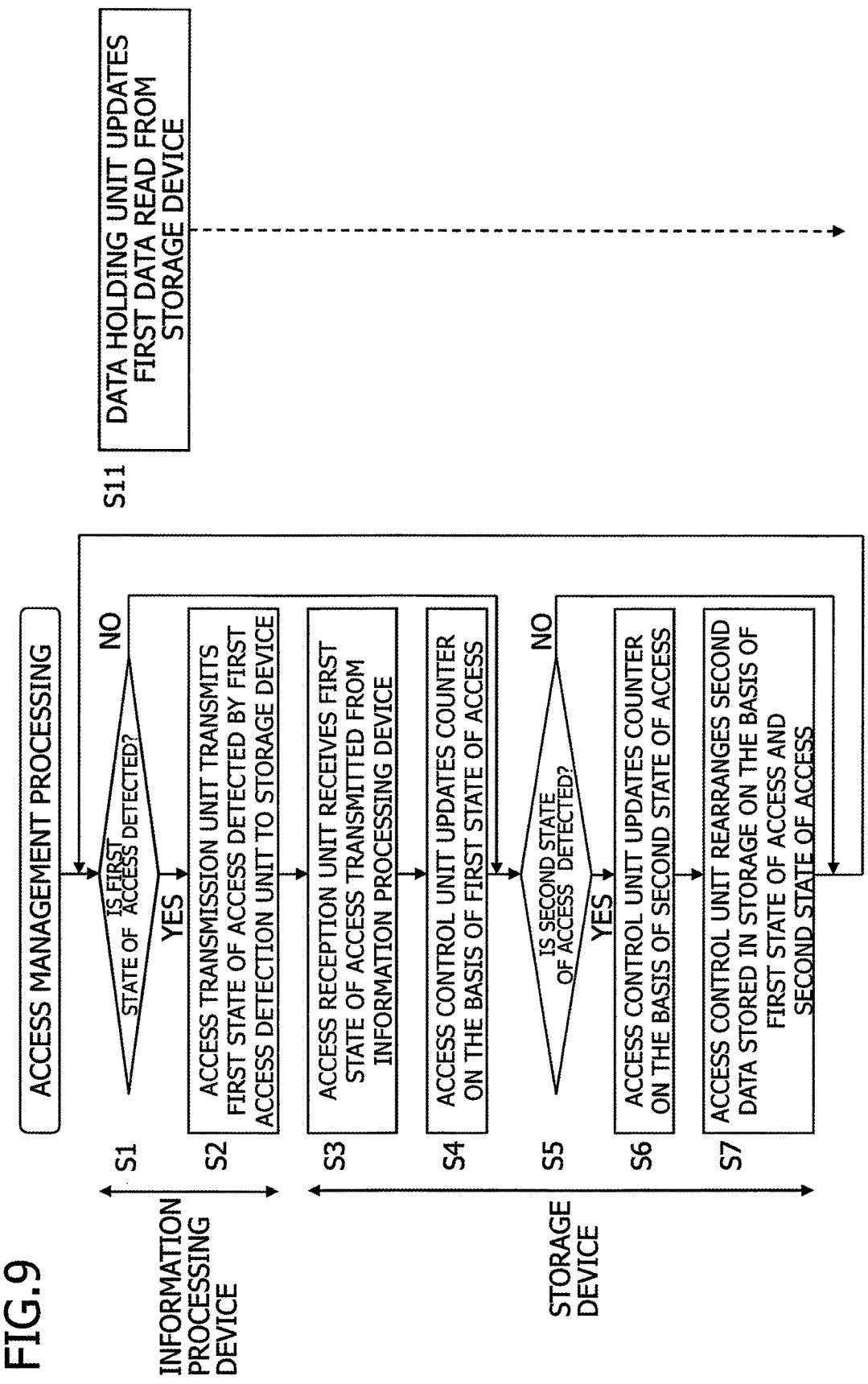
FIG. 9 is a flowchart illustrating the outline of the access management processing in the first embodiment.
Figure 10:
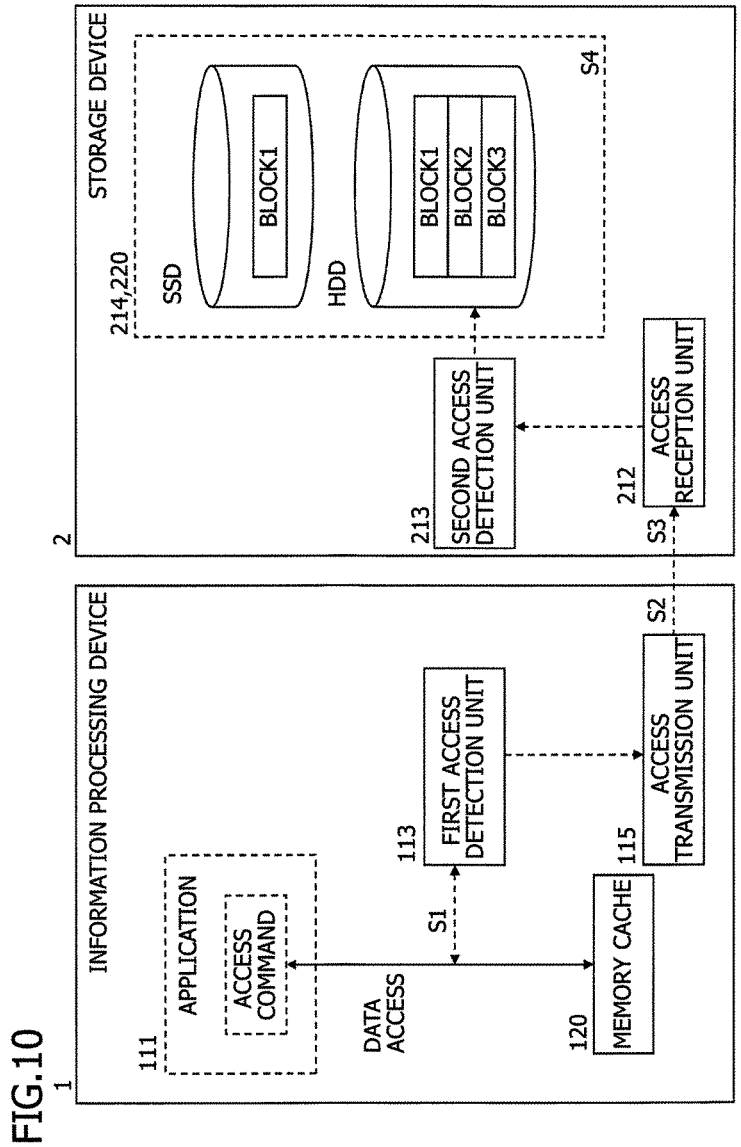
FIG. 10 illustrates the processing outline in the case in which the first state of access is detected.
Figure 11:
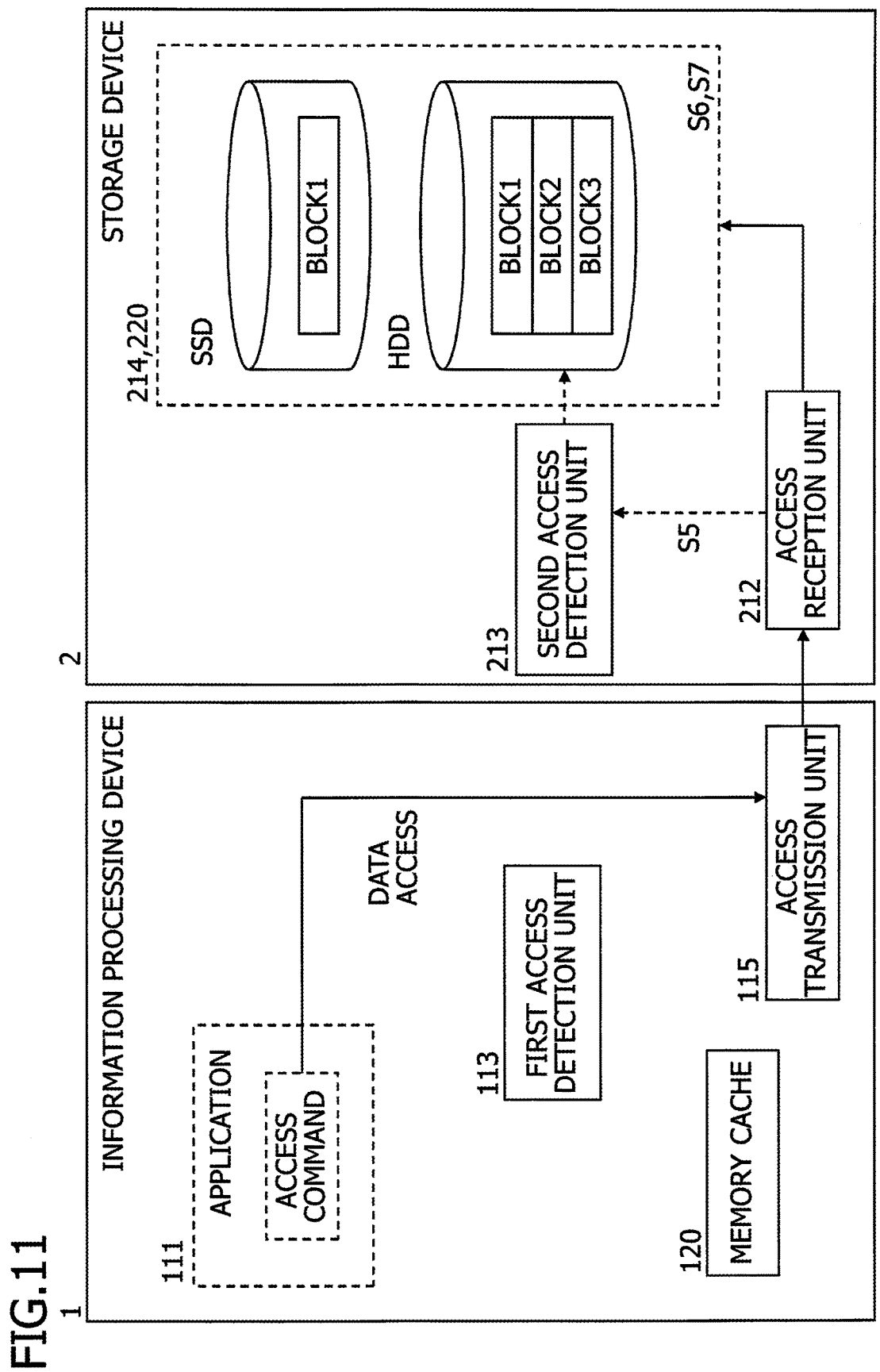
FIG. 11 illustrates the processing outline in the case in which the second state of access is detected.

Initially, the first embodiment is explained. FIG. 9 is a flowchart illustrating the outline of the access management processing in the first embodiment. FIGS. 10 and 11 illustrate the outline in the case in which the state of access is detected. The outline of the access management processing depicted in FIG. 9 is explained with reference to FIGS. 10 and 11. In FIGS. 9, S1, S2, and S11 are the processing steps performed by the information processing device 1, and S2 to S6 are the processing steps performed by the storage device 2.

[Detection of First State of Access]

At the beginning, the first access detection unit 113 of the information processing device 1 detects the first state of access as indicated by the flowchart on the left side of FIG. 9 (YES in S1).

The first state of access is the state of access to the first data stored in the memory cache 120 of the information processing device 1. The first state of access is, for example, the number of times the first data have been accessed per unit time. The first state of access may also be, for example, the time it takes to reach a predetermined number of accesses to the first data. Therefore, the first access detection unit 113 detects the first state of access once the abovementioned unit time elapses or once the abovementioned predetermined number of accesses to the first data is reached. Further, each time the first data are accessed, the first access detection unit 113 may detect this as the first state of access.

Then, the access transmission unit 115 of the information processing device 1 transmits the first state of access detected by the first access detection unit 113 to the storage device 2 (S2), and the access reception unit 212 of the storage device 2 receives the first state of access transmitted from the access transmission unit 115 (S3). Then, the access control unit 214 of the storage device 2 updates, for example, the counter provided in the storage device 2 on the basis of the first state of access received by the access reception unit 212 (S4).

FIG. 10 illustrates the processing outline in the case in which the first state of access is detected. In FIG. 10, the first access detection unit 113 detects, for example, the data access by the application 111 to the memory cache 120 (S1). The first access detection unit 113 is, for example, a function of middleware. The access transmission unit 115 then transmits the data access to the memory cache 120, which has been detected by the first access detection unit 113, to the storage device 2 (S2). When the first state of access is received by the access reception unit 212 (S3), the access control unit 214 reflects the contents of the first state of access, for example, in a counter (not shown in the figure) provided in the storage device 2 (S4). In the example depicted in FIG. 10, the access reception unit 212 transmits the first state of access to the access control unit 214 through the second access detection unit 213. Further, in FIG. 10, the flow for performing the data access is shown by a solid line, and the flow for reflecting the first state of access in the counter is shown by a broken line.

[Detection of Second State of Access]

Returning to FIG. 9, the second access detection unit 213 of the storage device 2 performs the detection of the second state of access (YES in S5).

The second state of access is the state of access to the second data stored in the storage 220 of the storage device 2. Similarly to the first state of access, the second state of access is, for example, the number of times the second data have been accessed per unit time. The second state of access may also be, for example, the time it takes to reach a predetermined number of accesses to the second data. Therefore, the second access detection unit 213 detects the second state of access once the abovementioned unit time elapses or once the abovementioned predetermined number of accesses to the second data is reached. Further, each time the second data are accessed, the second access detection unit 213 may detect this as the second state of access.

The access control unit 214 of the storage device 2 then updates the counter on the basis of the second state of access detected by the second access detection unit 213 (S6). The access control unit 214 then rearranges the second data stored in the storage 220 of the storage device 2 on the basis of the counter contents (counter contents reflecting the first state of access and the second state of access) (S7).

FIG. 11 illustrates the processing outline in the case in which the second state of access is detected. In FIG. 11, the second access detection unit 213 detects the data access by the application 111 to the storage 220 (S5). In the example depicted in FIG. 11, the second access detection unit 213 detects the data access to the storage in the access reception unit 212. Then, the access control unit 214 of the storage device 2 updates the counter on the basis of the second state of access detected by the second access detection unit 213 (S6). The access control unit 214 then rearranges the second data stored in the storage 220 of the storage device 2 on the basis of the counter contents (S7). The rearrangement of the second data by the access control unit 214 may be performed each time the second state of access is reflected in the counter, when the second state of access is reflected a predetermined number of times in the counter, or for each predetermined period of time. Further, in FIG. 11, the flow for performing the data access is shown by a solid line, and the flow for reflecting the second state of access in the counter is shown by a broken line.

The flowchart on the right side in FIG. 9 is explained below. In parallel with the processing of the above-described steps S1 to S6, the memory cache 120 of the information processing device 1 performs the processing of updating the first data which have been held as shown by the flowchart on the right side in FIG. 9 (S11). For example, the memory cache 120 maintains, without deleting, the data with a high access frequency, from among the data stored in the storage 220 in the storage device 2, in the memory cache 120. Then, the data with a low access frequency, from among the data stored in the memory cache 120, are deleted. As a result, the data with a high access frequency can be stored in the memory cache 120. Therefore, data access by the application 111 can be efficiently performed.

Thus, according to the present embodiment, the information processing device 1 holds the first data, which have been read from the storage device, with the data holding unit 120 and detects the first state of access to the first data with the first access detection unit 113. The first state of access detected by the first access detection unit 113 is then transmitted by the access transmission unit 115 to the storage device 2. The storage device 2 stores the second data including the first data with the data storage unit 220 and receives the first state of access with the access reception unit 212. The second state of access to the second data is detected by the second access detection unit 213, and the second data are rearranged in the data storage unit 220 by the access control unit 214 on the basis of the first and second state of access. As a result, the access control unit 214 can cause the operation of the automatic hierarchization technique in a state reflecting the information relating to the data access by the application 111 to the memory cache 120.

[Details of the First Embodiment]

Figure 12:
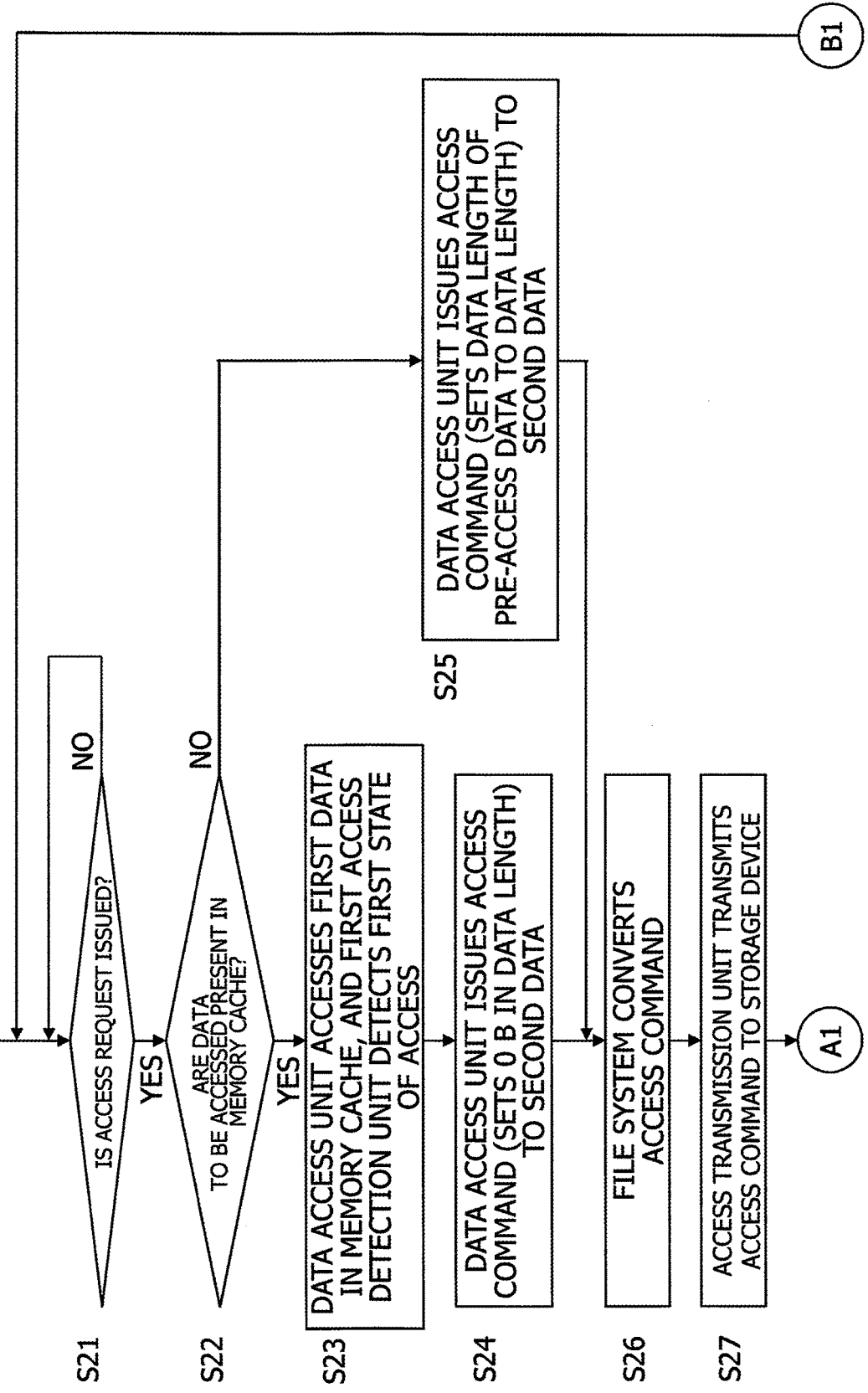
FIG. 12 is the flowchart illustrating the details of the access management processing in the first embodiment.
Figure 13:
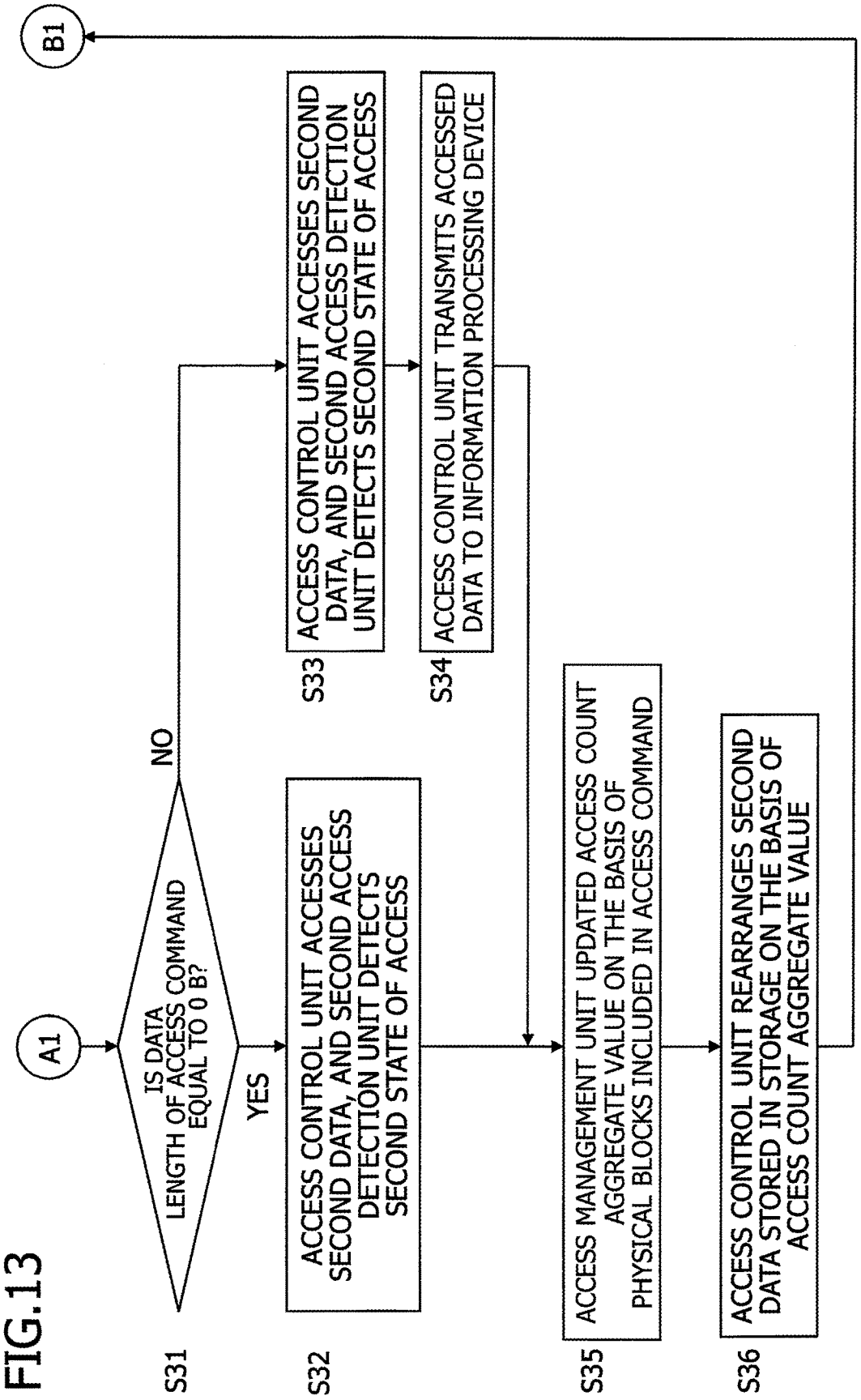
FIG. 13 is the flowchart illustrating the details of the access management processing in the first embodiment.
Figure 14:
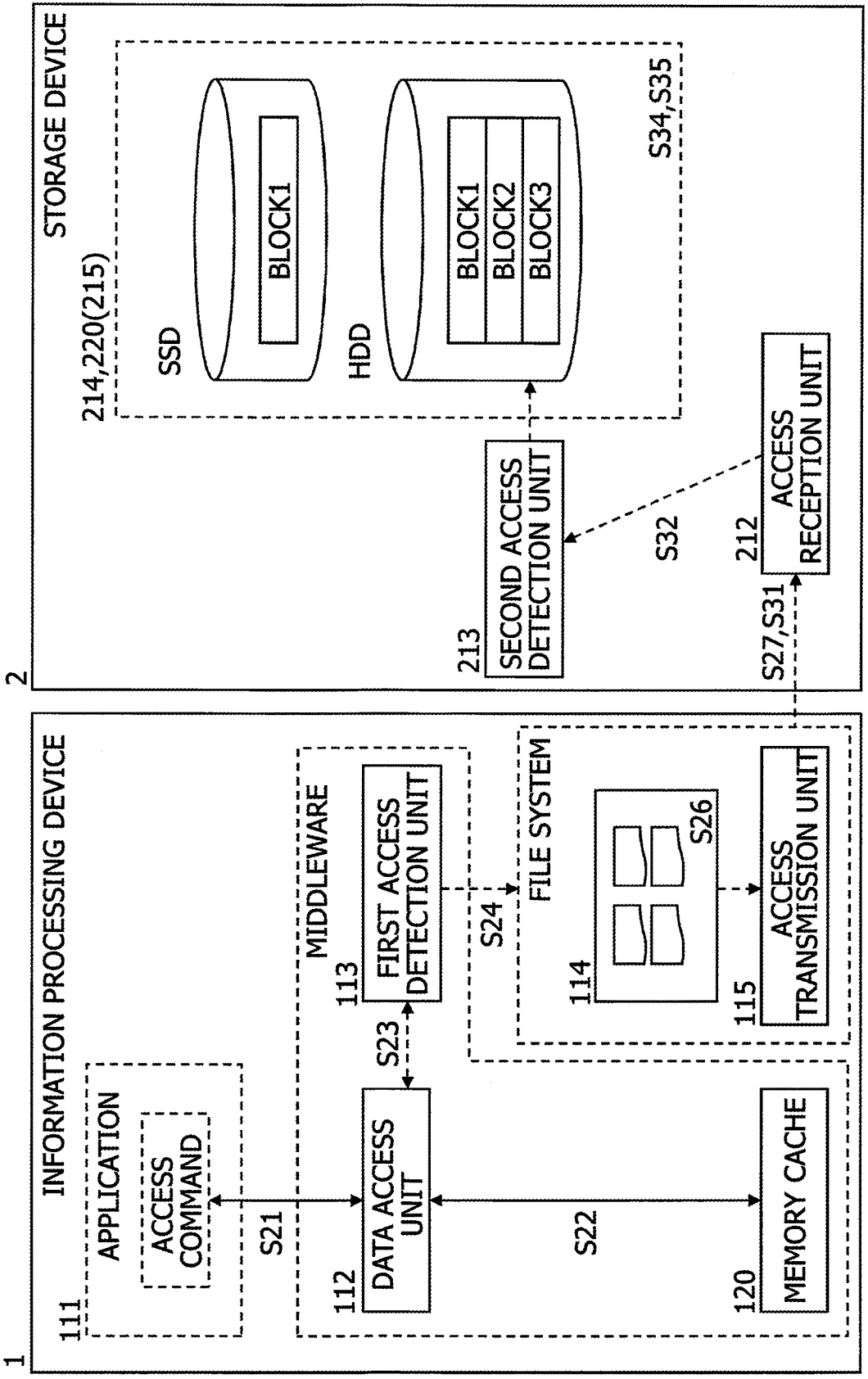
FIG. 14 illustrates the details in the case in which the state of access is detected.
Figure 15:
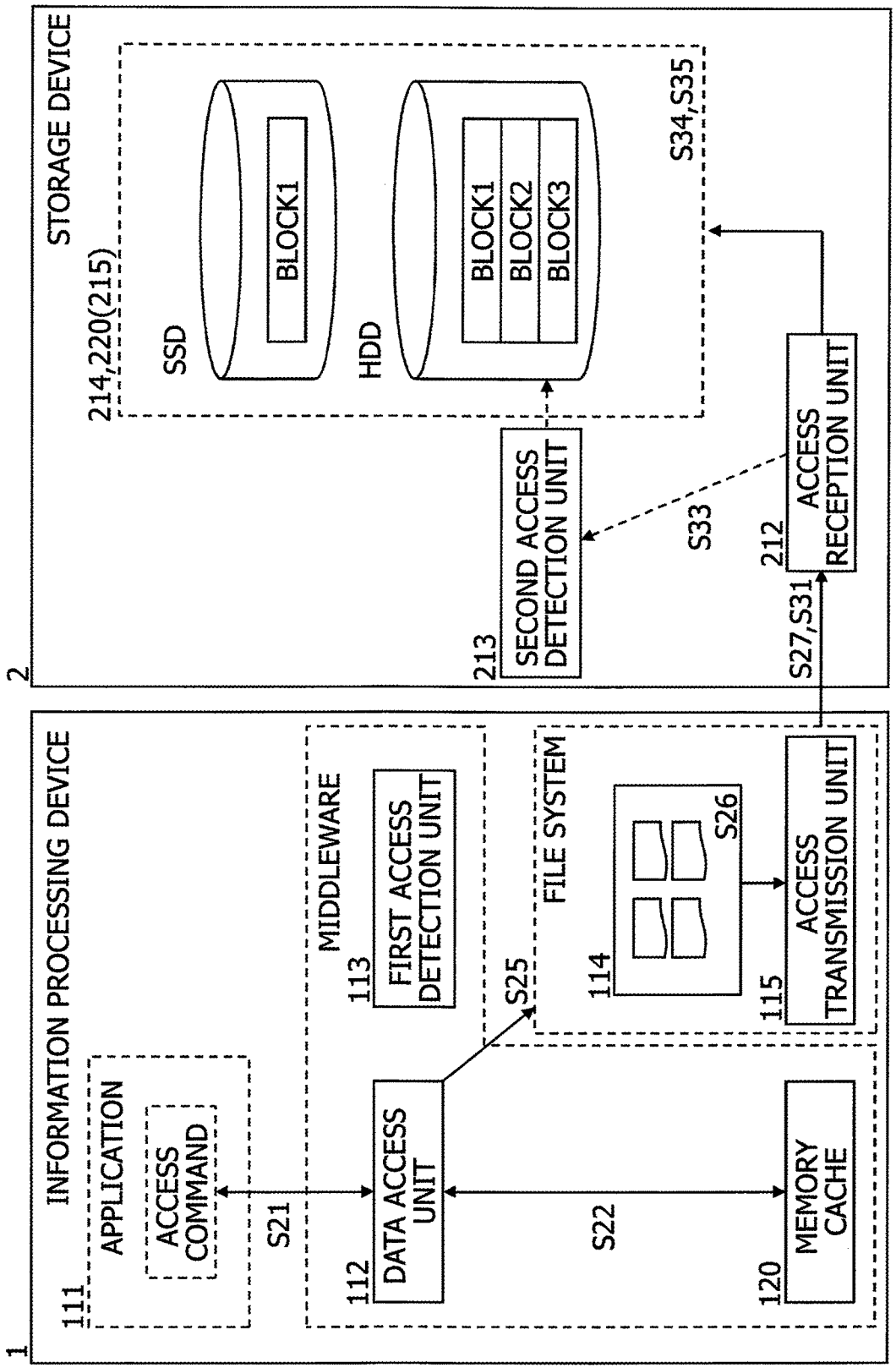
FIG. 15 illustrates the details in the case in which the state of access is detected.
Figure 16:
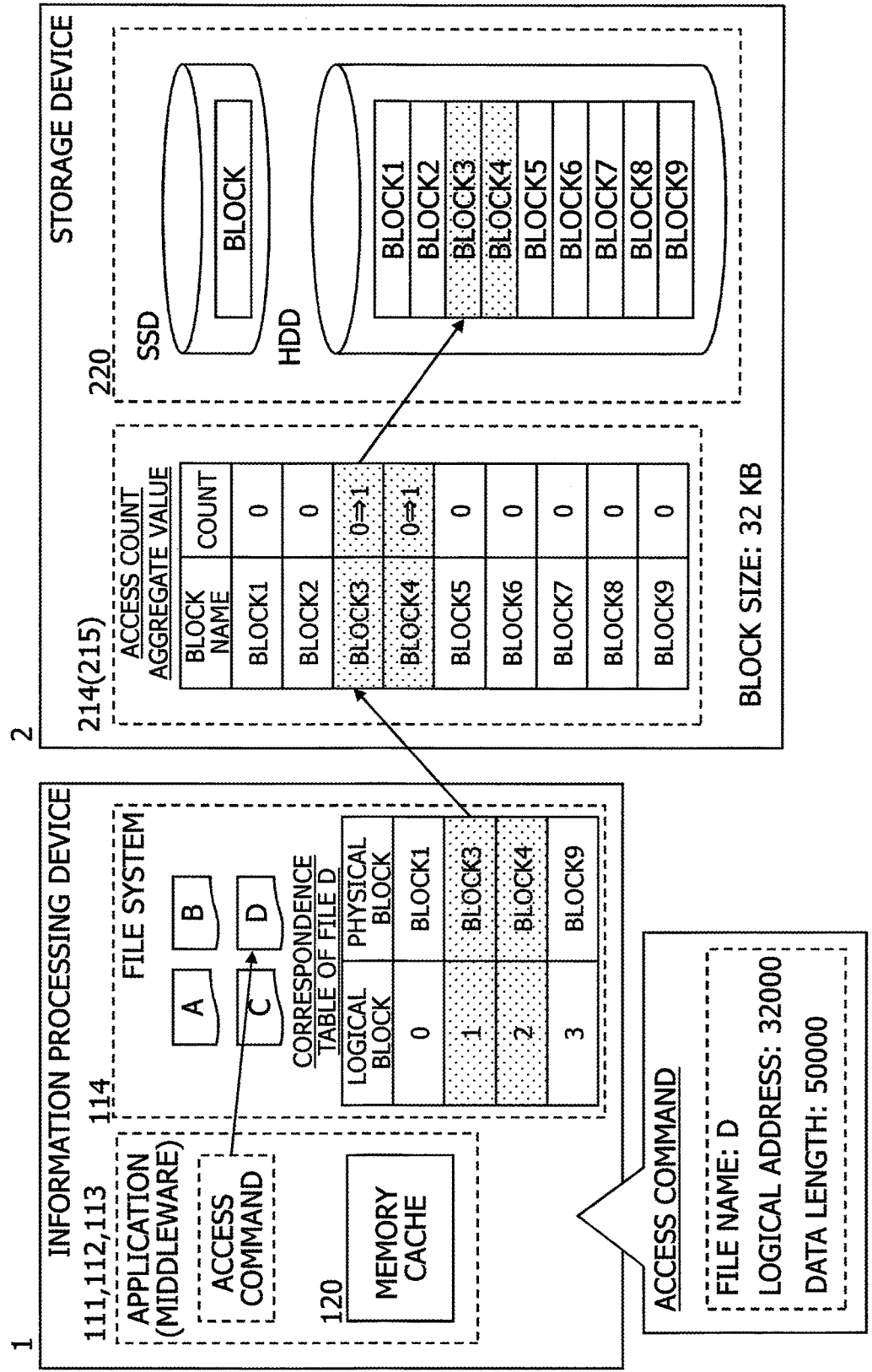
FIG. 16 illustrates the access management processing in the case in which data in the storage device are accessed.
Figure 17:
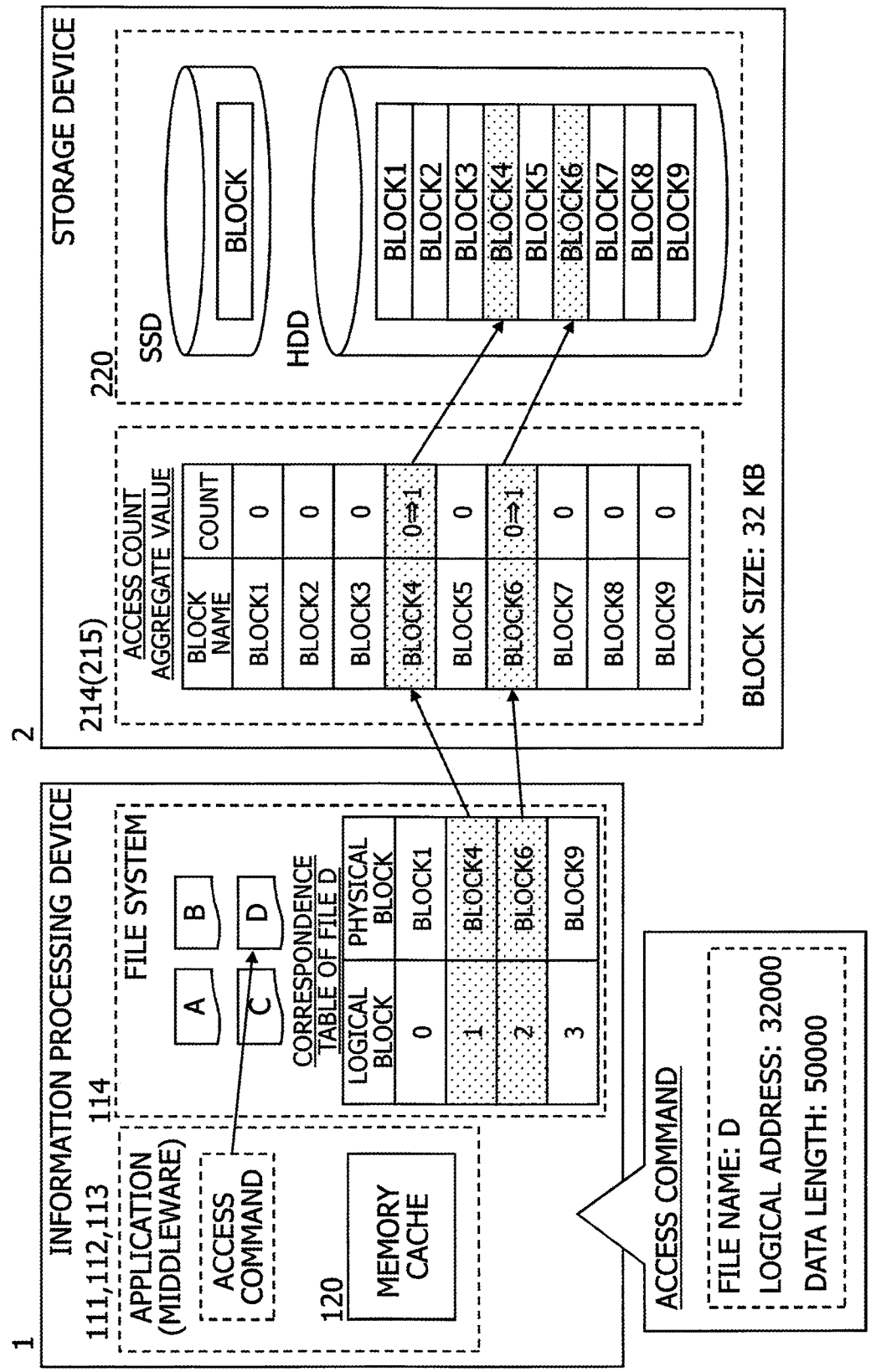
FIG. 17 illustrates the access management processing in the case in which data in the storage device are accessed.
Figure 18:
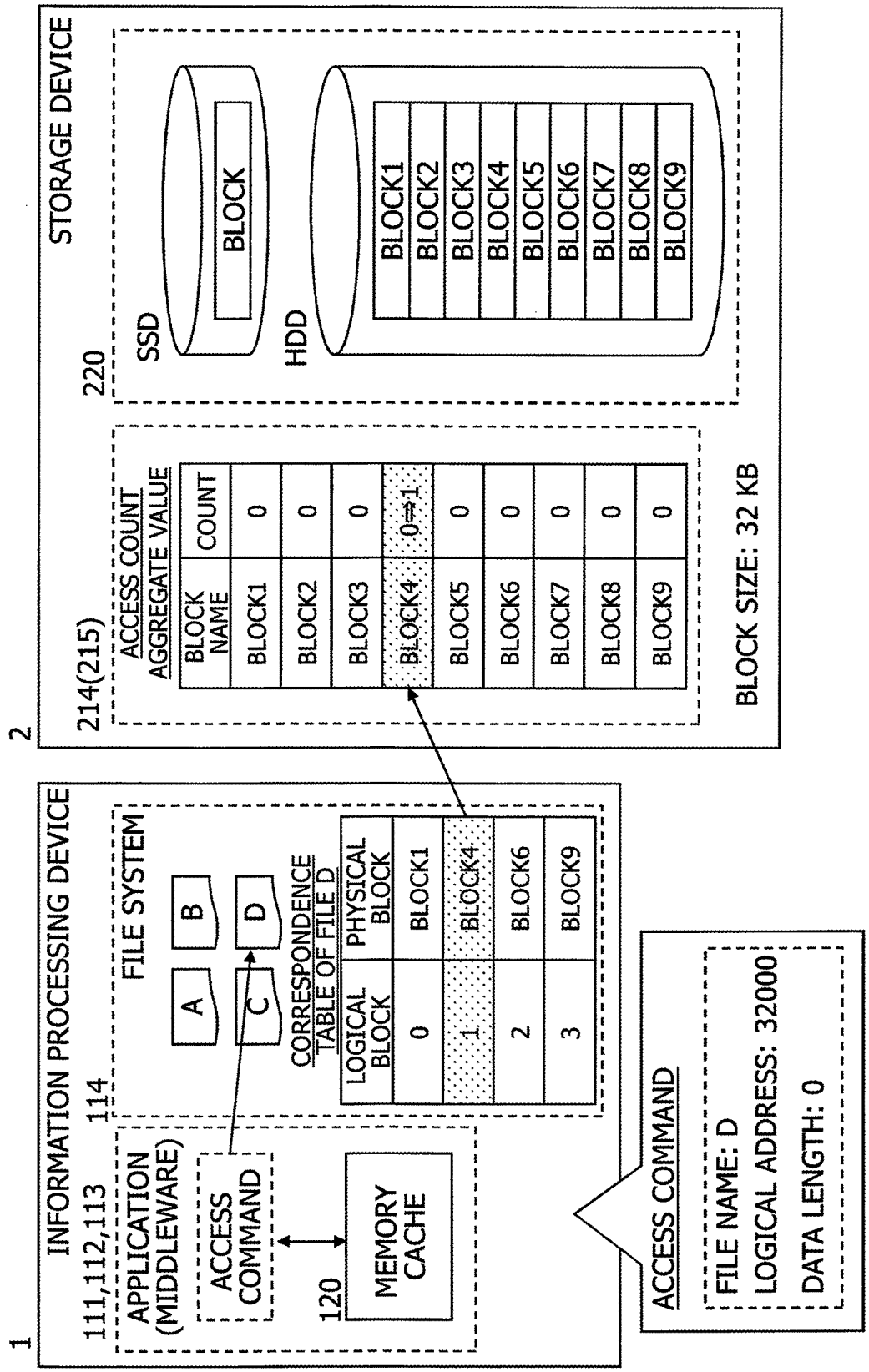
FIG. 18 illustrates the access management processing in the case in which data in the memory cache are accessed in the first embodiment.
Figure 19:
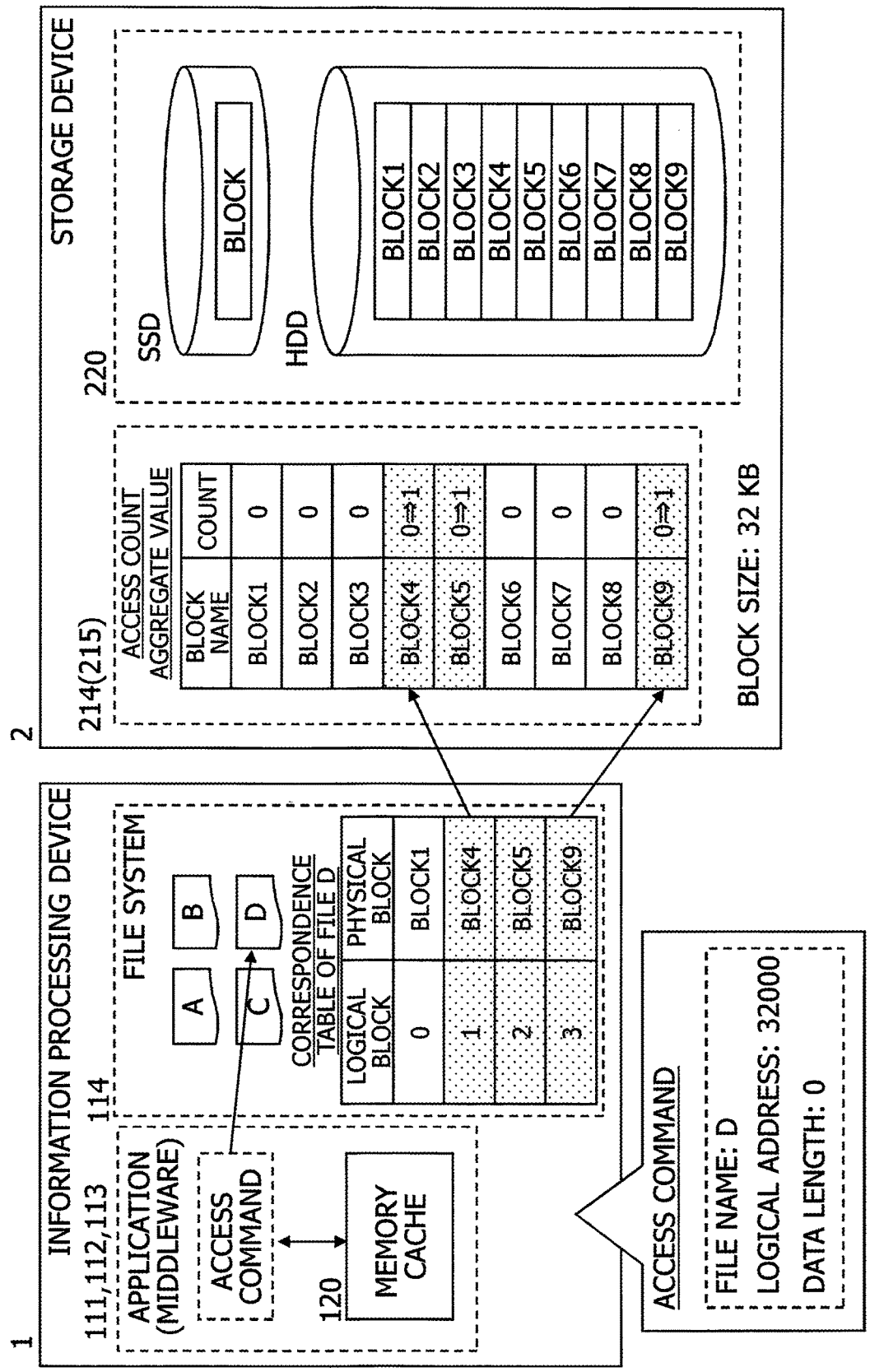
FIG. 19 illustrates the access management processing in the case in which data in the memory cache are accessed in the first embodiment.

The details of the first embodiment are described hereinbelow. FIGS. 12 and 13 are the flowcharts illustrating the details of the access management processing in the first embodiment. FIGS. 14 and 15 illustrate the details in the case in which the state of access is detected. FIGS. 16 and 17 illustrate the access management processing in the case in which data in the storage device are accessed. FIGS. 18 and 19 illustrate the access management processing in the case in which data in the memory cache are accessed in the first embodiment. The details of the access management processing illustrated by FIGS. 12 to 15 are explained hereinbelow with reference to FIGS. 16 to 19.

[Details of Processing Performed by Information Processing Device]

Initially, when the application 111 issues the access command to access the first data or second data (YES in S21), the data access unit 112 checks whether or not the data to be accessed are present in the memory cache 120 on the basis of the contents of the issued access command, as depicted in FIG. 14 (S22).

When the data to be accessed are contained in the first data (YES in S22), the data access unit 112 (a middleware portion in the example depicted in FIGS. 14 and 15) accesses the first data in the memory cache 120 (S22). In this case, the first access detection unit 113 (a middleware portion in the example depicted in FIGS. 14 and 15) detects the first state of access of the application 111 to the first data, as depicted in FIG. 14 (S23). In the example depicted in FIG.

12, it is assumed that the first access detection unit 113 performs the detection of the first state of access each time the data access unit 112 accesses the memory cache 120. Then, the data access unit 112, for example, issues to the file system 114 an access command (also referred to hereinbelow as a first access command) that sets 0 B as the data length in the access command issued by the application 111 (S24). Thus, in the present embodiment, the access command for accessing the data in the storage device 2 is used for transmitting the information (first state of access), which relates to the access to the memory cache 120, to the storage device 2.

More specifically, when the information relating to the access to the memory cache 120 is transmitted, the data access unit 112 issues an access command in a state in which 0 B is set as the data length of the access command. For example, similarly to the case explained with reference to FIG. 5, the access command is constituted by a file name indicating a file in the file system 114, a logical address, and a data length of the data to be accessed. In the example depicted in FIG. 14, the data access unit 112 issues the first access command to the file system 114 through the first access detection unit 113.

Meanwhile, when the first data are not included in the data to be accessed (NO in S22), the data access unit 112 issues an access command in which the data length of the data to be accessed is set as the data length (S25). The data access unit 112 may directly transmit the access command issued by the application 111 to the file system 114. In the example depicted in FIG. 15, the data access unit 112 accesses the file system 114 not through the first access detection unit 113 (S25).

Then, the file system 114 converts the logical address in the access command into a physical block, as explained with reference to FIG. 5 (S26). The access transmission unit 115 (for example, part of the file system 114) then transmits the access command after the conversion which includes the physical block (referred to hereinbelow as the "post-conversion access command") to the storage device 2 (S27).

The post-conversion access command includes, for example, a leading physical block and the number of physical blocks (also referred to hereinbelow as a the number of blocks) which are to be continuously accessed after the leading physical block, from among the physical blocks acquired by the address conversion in S26. The post-conversion access command also includes, for example, the data length that has been contained in the access command before the conversion. As a result, when 0 B is set as the data length, the storage device 2 that has received the post-conversion access command can determine that the access command is for notifying the storage device 2 that the first data in the memory cache 120 have been accessed. When the set data length is other than 0 B, the storage device 2 that has received the post-conversion access command determines that the access command is for accessing the second data in the storage 220 from the application 111. Thus, by having a single application (access command), the information processing device 1 can issue an access command for notifying the storage device 2 that the memory cache 120 has been accessed and an access command for accessing the storage 220. When the access transmission unit 115 transmits the post-conversion access command in physical block units, the post-conversion access command may have, for example, only the physical blocks and data length. Further, in FIGS. 14 and 15, the flow for performing the data access is shown by a solid line, and the flow for reflecting the first state of access in the counter is shown by a broken line.

[Details of Processing in Storage Device]

Where the data length of the post-conversion access command received from the information processing device 1 is 0 B (YES in S31), the access control unit 214 in the storage device 2 accesses the second data stored in the storage 220. Then, the second access detection unit 213 detects the second state of access on the basis of the access to the second data by the access control unit 214, as depicted in FIG. 14 (S32). Further, the access management unit 215 updates the access count aggregate value (also referred to hereinbelow as aggregate value) on the basis of the physical blocks included in the post-conversion access command (S35). The access count aggregate value is explained in FIGS. 16 to 20. When the data length of the received post-conversion access command is 0 B (YES in S31), the search or seek of the data stored in the storage 220 may not be performed.

Meanwhile, when the data length of the access command received from the information processing device 1 is not 0 B (NO in S31), the access control unit 214 accesses the second data stored in the storage 220. In this case, the second access detection unit 213 detects the second state of access of the application 111 to the second data as depicted in FIG. 15 (S33). Furthermore, the access control unit 214 transmits the accessed second data to the application 111 that has requested the data access (S34). The access management unit 215 then updates the aggregate value on the basis of the physical block included in the post-conversion access command (S35).

Thus, when the data length of the post-conversion access command received from the information processing device 1 is 0 B, the post-compression access command is not aimed at accessing the data in the storage device 2. Therefore, it is not necessary for the access control unit 214 to perform search and seek for accessing the second data or to transmit the data to the application 111 that has requested the data access. As a consequence, the storage device 2 can reflect the information relating to the access to the memory cache 120 in the aggregate value, without performing the unnecessary search, seek, or data transmission.

Then, the access control unit 214 rearranges the second data stored in the storage 220 on the basis of the aggregate value (S36). Thus, the access control unit 214 rearranges the second data on the basis of the first state of access and second state of access reflected in the aggregate value before the timing at which the second data are rearranged.

[Specific Example (1) of First Embodiment]

A specific example of the first embodiment is explained below. Explained initially is the case in which the application 111 accesses the second data in the storage device 2 (the case in which the data to be accessed are not present in the memory cache 120). FIGS. 16 and 17 illustrate the access management processing in the case in which the data in the storage device are accessed.

In the example depicted in FIG. 16, when the application 111 accesses the second data in the storage device 2, the data access unit 112 issues an access command including a logical address to the file system 114, as explained with reference to FIG. 5 (S25 in FIG. 12). Then, the file system 114 converts the logical address included in the access command issued by the data access unit 112 into a physical block (S26 in FIG. 12). A specific example relating to the case in which the logical address included in the access command is converted into the physical block is explained hereinbelow. The explanation below is conducted by assuming, in the same manner as in the case depicted in FIG. 5, that the block size of the logical block and the block size of the physical block is 32 KB.

In the example depicted in FIG. 16, the data length included in the access command is 50000 (50 KB). Since the block size of each logical block is 32 KB, the data that are to be accessed by the application 111 are stored over two logical blocks. Further, the logical address included in the access command is 32000 (32 KB). Therefore, the data that are to be accessed by the application 111 are stored in the logical block 1 and the logical block 2 in the example depicted in FIG. 16. Further, the file system 114 acquires information of the block 3 and block 4, which are the physical blocks corresponding to the logical block 1 and logical block 2, by referring to the correspondence table of the physical blocks and logical blocks of the file D, as depicted in FIG. 16. The conversion from the logical address to the physical blocks is thereby completed.

Then, the access transmission unit 115 transmits the post-conversion access command to the access reception unit 212 in the storage device 2 (S27 in FIG. 12). The post-conversion access command in the example depicted in FIG. 16 includes, for example, the following information: the leading physical block is the block 3, the number of blocks is 2, and the data length is a value other than 0 B (for example, 50 KB which is the size of the data to be accessed).

The access management unit 215 then increments by 1 the count of the block 3 and block 4 of the access count aggregate value, as indicated in FIG. 16, on the basis of the post-conversion access command received by the access reception unit 212 (S35 in FIG. 13). The access count aggregate value is explained hereinbelow.

The access management unit 215 stores the aggregate value of the second state of access to the second data stored in each unit area and the first state of access to the first data in the memory cache 120, which correspond to the second data stored in the unit area, for each unit area in the storage 220. The unit area may be, for example, a physical block unit. In the example depicted in FIG. 16, the HDD has nine physical blocks (block 1 to block 9), and the access management unit 215 aggregates the access count for every nine physical blocks.

More specifically, the access management unit 215 updates the aggregate value of the unit area corresponding to the received first state of access when the access reception unit 212 receives the first state of access. For example, in the case in which the data of the block 3 are held in the memory cache 120, the access count of the block 3 is updated when the access management unit 215 receives the first state of access indicating that the data of the block 3 in the memory cache 120 have been accessed. Further, the access management unit 215 updates the aggregate value of the unit area corresponding to the detected second state of access when the second access detection unit 213 detects the second state of access.

Since the data length of the post-conversion access command is not 0 B (NO in S31), the access control unit 214 then accesses the block 3 and block 4 in the HDD of the storage 220 on the basis of the post-conversion access command, as indicated in FIG. 16 (S33 in FIG. 13). For example, the access control unit 214 transmits the data of the block 3 and block 4 to the file system 114 and transmits the data based on the access command, from among the data received by the file system 114, to the application 111 (S34 in FIG. 13). Data access by the application 111 to the storage 220 is thus completed.

When the storage position of the physical block which is to be accessed is separated (the case in which the storage positions are not sequential), the file system 114 may not issue a plurality of post-conversion access commands to the storage device 2. For example, in FIG. 17, the physical blocks in the storage device 2 which are to be accessed by the application 111 are the block 4 and block 6, and the storage positions thereof are separated. In this case, the file system 114 issues, for example, a post-conversion access command in which the leading physical block is the block 4, the number of blocks is 1, and the data length has a value other than 0 B (for example, 32 KB). Then, the file system 114 may issue a post-conversion access command in which the leading physical block is the block 6, the number of blocks is 1, and the data length has a value other than 0 B (for example, 18 KB). Thus, in the example depicted in FIG. 17, for example, the file system 114 may issue two post-conversion access commands.

In the example illustrated by FIGS. 16 and 17, the storage 220 is accessed after the access count aggregate value has been updated, but the access count aggregate value may be also updated after the storage 220 has been accessed, as indicated in FIG. 13.

[Specific Example (2) of First Embodiment]

The case in which the application 111 accesses the data in the memory cache 120 (the case in which the data to be accessed are present in the memory cache 120) is explained hereinbelow. FIGS. 18 and 19 illustrate the access management processing performed when the data in the memory cache of the first embodiment are accessed.

In the example depicted in FIG. 18, when the application 111 accesses the data in the memory cache 120, the data access unit 112 issues an access command in which the data length of the access command issued by the application is set to 0 B (S24 in FIG. 12). Similarly to the case explained with reference to FIG. 16, the access command in the example depicted in FIG. 18 is constituted by a file name indicating a file in the file system 114, a logical address, and a data length of the data to be accessed. In the example depicted in FIG. 18, the file name of the access command is D, the logical address is 32000 (32 KB), and the data length is 0 (0 B). As explained with reference to FIG. 14, the data access unit 112 may also set 0 B as the data length of the access command issued by the application 111.

Then, the file system 114 converts the logical address included in the access command issued by the data access unit 112 into a physical block. In the example depicted in FIG. 18, since the file name of the logical address is shown to be D, the logical address is converted into the physical block with reference to the correspondence table of the logical block of the file D stored in the file system 114 and the physical block (S26 in FIG. 12). The details of conversion from the logical address included in the access command to the physical block have been explained with reference to FIG. 16, and the redundant explanation thereof is herein omitted.

In the example depicted in FIG. 18, the data length included in the access command is 0 B. Further, the logical address included in the access command corresponds to the logical block 1. Therefore, the application 111 accesses the logical block 1. The file system 114 completes the conversion from the logical address to the physical block by acquiring information of the block 4, which is the physical block corresponding to the logical block 1, with reference to the correspondence table of the logical block of the file D and the physical block. The access transmission unit 115 then transmits the post-conversion access command to the access reception unit 212 in the storage device 2 (S27 in FIG. 12). The post-conversion access command in the example depicted in FIG. 18 may include information on the physical block and data length. More specifically, the post-conversion access command in the example depicted in FIG. 18 may be constituted, for example, by information in which the leading physical block is the block 4 and the data length is 0 B.

Further, the access management unit 215 increments by 1 the count of the access count aggregate value of the block 3 and block 4, as shown in FIG. 16, on the basis of the post-conversion access command received by the access reception unit 212 (S35 in FIG. 13). Since the data length of the post-conversion access command is 0 B (YES in S31 of FIG. 13), the access control unit 214 may not perform the search and seek in the access of the block 3 and block 4 in the HDD of the storage 220, as shown in FIG. 18 (S32 in FIG. 13).

As a result, the storage device 2 can be notified that the memory cache 120 has been accessed by the application issuing an access command for accessing the storage 220. Thus, the storage device 2 can be notified that the memory cache 120 has been accessed, without creating newly an application. Further, the access count aggregate value can be updated with respect to the very first of the physical blocks storing the data in the memory cache 120 which has been accessed by the application 111. In addition, the access control unit 214 can rearrange the data in the storage 220 on the basis of the access count aggregate value reflecting the information on the access to the memory cache 120.

Further, as indicated in the example depicted in FIG. 19, the conversion from a logical address to a physical block by the file system 114 may be performed with respect to all of the logical addresses from the logical address of the second data in the file including the second data to the logical address indicating the final position in the file. More specifically, in the example depicted in FIG. 19, the logical address included in the access command is 32000 and the data length is 0 B. Therefore, the file system 114 converts to the physical blocks the logical blocks allocated from the logical block 1 to the logical block 3 which is the very last logical block of the file D. Thus, the file system 114 acquires information on the block 4, block 5, and block 9 which are the physical blocks corresponding to the access command. In the example depicted in FIG. 19, the block 4 and the block 5 occur in succession, and the block 9 is not a sequential block. Therefore, the access transmission unit 115 transmits to the storage device 2, for example, a post-conversion access command in which the leading physical block is the block 4, the number of blocks is 2, and the data length is 0 B. Then, a post-conversion access command in which the leading physical block is the block 9, the number of blocks is 1, and the data length is 0 B may be transmitted to the storage device 2.

Thus, where the memory cache 120 has been accessed, the file system 114 can transmit information to the effect that data of a plurality of logical blocks have been accessed to the storage device 2. Therefore, the access management unit 215 can update the access count aggregate value to a state close to the actual state of data access, for example, when the application 111 rarely accesses only part of the file.

In the examples depicted in FIGS. 18 and 19, it is determined whether or not to search for performing the access to the storage 220 after the access count aggregate value has been updated, but the access count aggregate value may be also updated after the determination relating to the search has been made, as depicted in FIG. 13.

[Second Embodiment]

Figure 20:
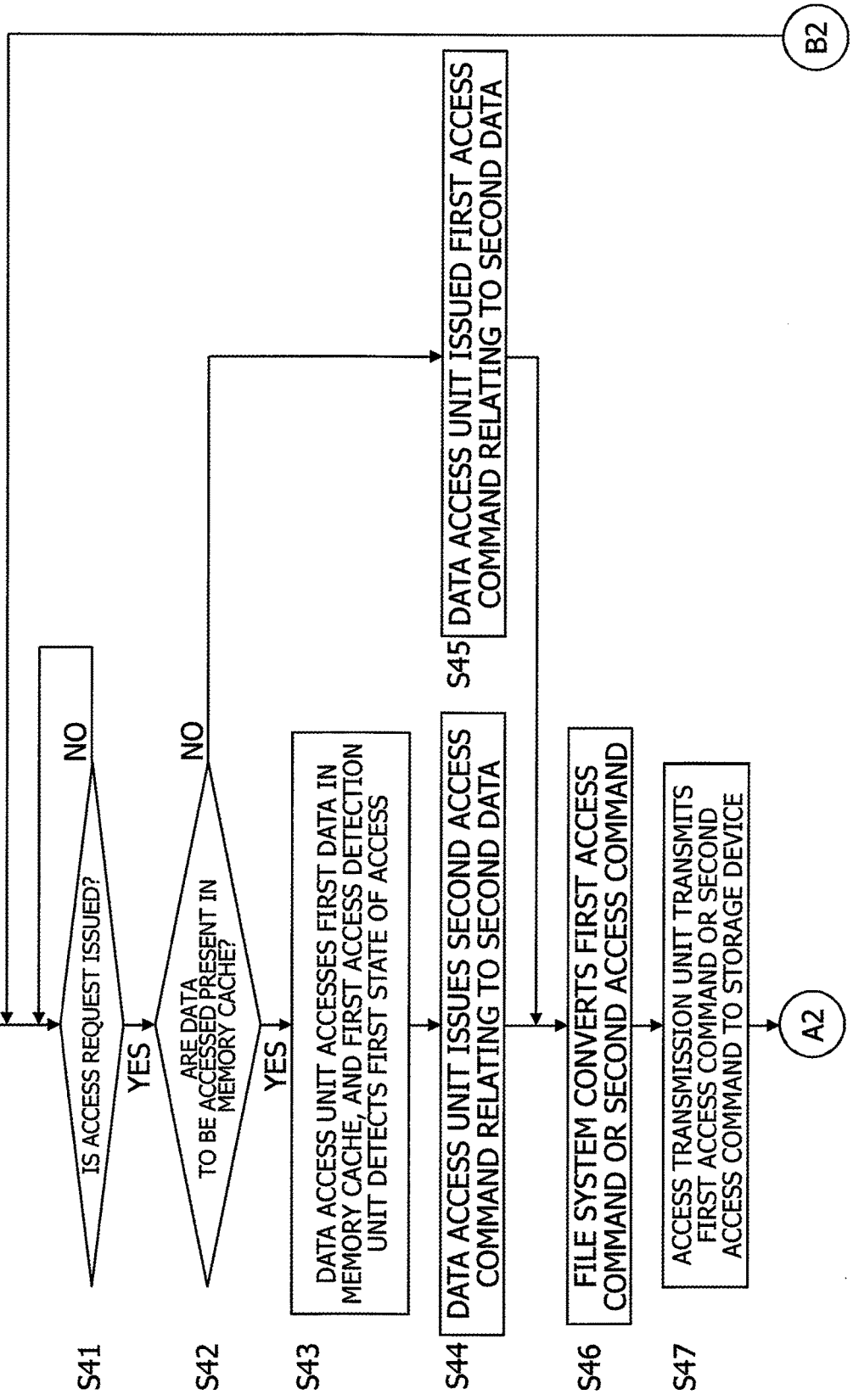
FIG. 20 depicts the flowcharts illustrating the details of the access management processing performed in the second embodiment.
Figure 21:
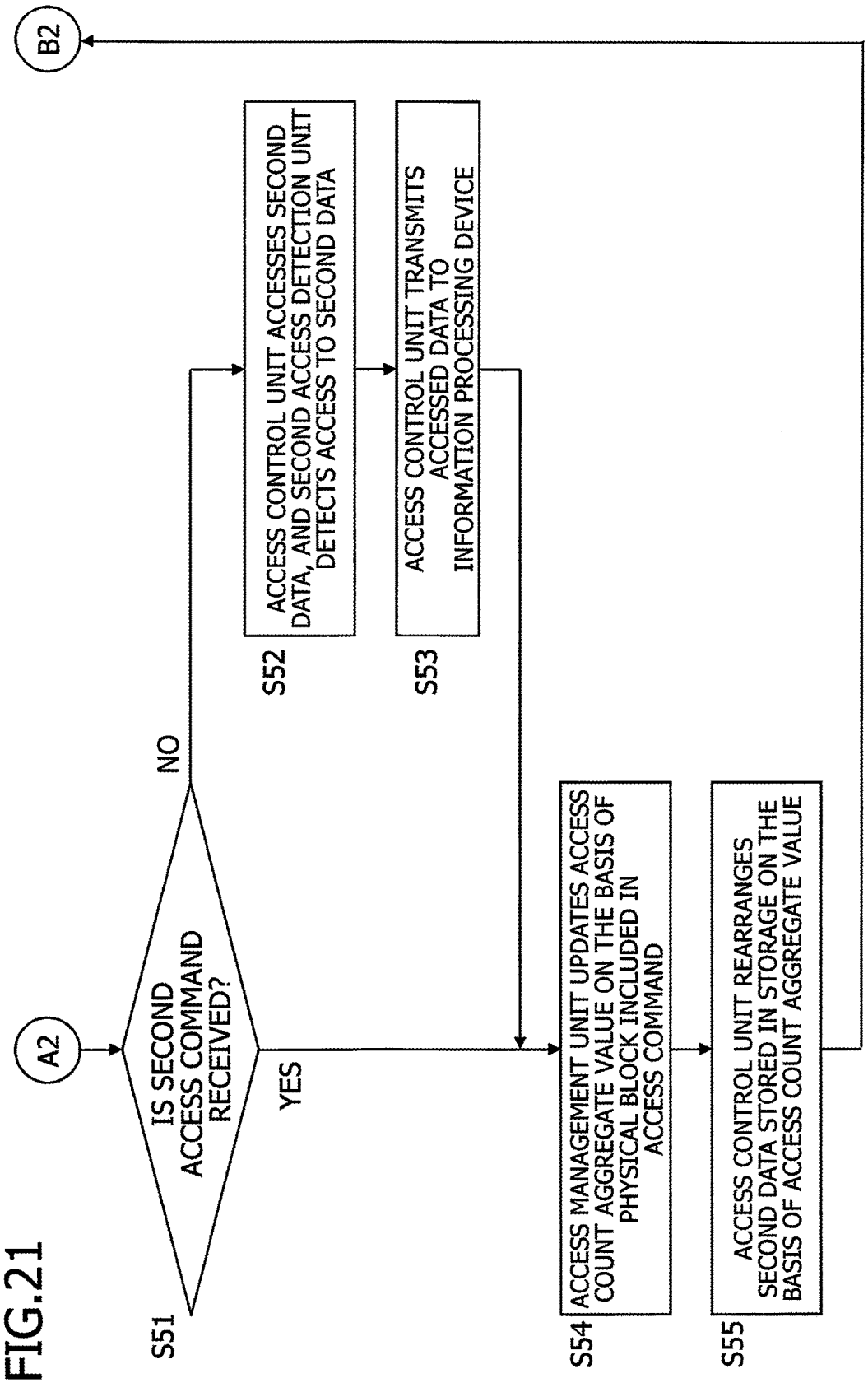
FIG. 21 depicts the flowcharts illustrating the details of the access management processing performed in the second embodiment.
Figure 22:
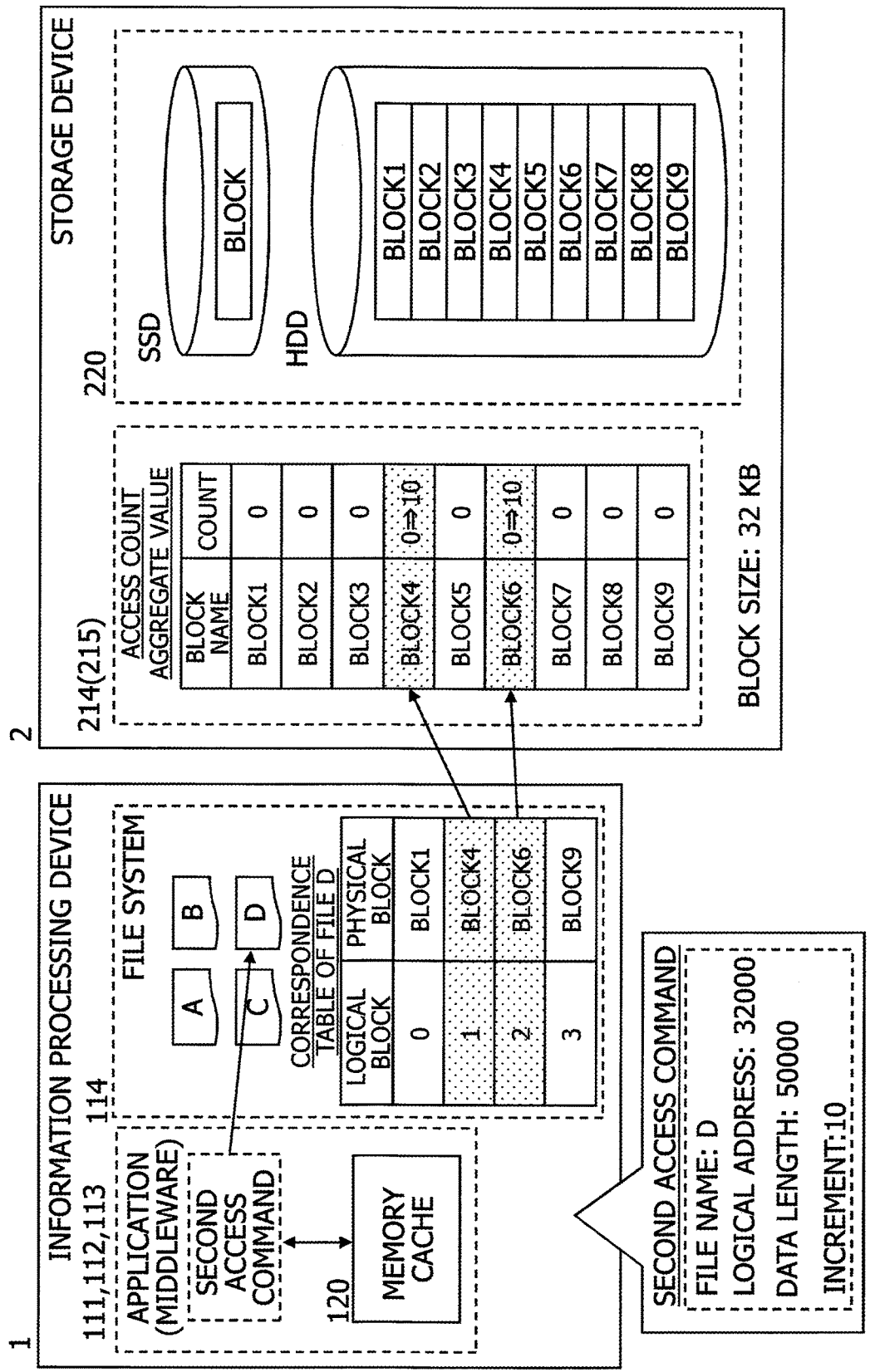
FIG. 22 illustrates the access management processing in the case in which data in the memory cache are accessed in the second embodiment.

The details of the second embodiment are explained below. FIGS. 20 and 21 depict the flowcharts illustrating the details of the access management processing performed in the second embodiment. FIG. 22 illustrates the access management processing in the case in which data in the memory cache are accessed in the second embodiment. The details of the access management processing illustrated by FIGS. 20 and 21 are explained with reference to FIG. 22.

[Details of Processing Performed by Information Processing Device]

Initially, when the application 111 issues an access command for accessing the first data or second data (YES in S41), the data access unit 112 (for example, a portion of middleware) checks whether or not the data to be accessed are present in the memory cache 120 on the basis of the contents of the issued access command (S42). The access command issued by the application 111 may be the same as the access command explained in the first embodiment.

When the data to be accessed are included in the first data (YES in S42), the data access unit 112 accesses the first data in the memory cache 120 (S43). In this case, the first access detection unit 113 (for example, a portion of middleware) detects the first state of access to the first data from the application 111 (S43). In the example depicted in FIG. 20, the detection of the first state of access is assumed to be performed each time the data access unit 112 accesses the memory cache 120.

Then, the data access unit 112 issues a command of access to second data (referred to hereinbelow also as the "second access command" or "CREAD command") in the storage device 2 to the file system 114 on the basis of the access command issued by the application 111 (S44).

Similarly to the access command explained with reference to FIG. 5, the second access command has a file name indicating the file in the file system 114, a logical address, and the length of the data to be accessed. In this case, the second access command is different from the first access command and is aimed at the transmission of the first state of access to the storage device 2, rather than at the access to the second data. More specifically, by contrast with the first access command in the first embodiment, the second access command has the length of the data in the memory cache 120 that have been actually accessed. Therefore, the file system 114 can convert the logical address into a physical block on the basis of the length of the data that have been actually accessed. The storage device 2 can perform the addition to the aggregate value of the access management unit 215 in the form corresponding to the data in the memory cache 120 that have been actually accessed.

Meanwhile, where the data to be accessed are not included in the first data (NO in S42), the data access unit 112 issues the first access command relating to the second data in the storage device 2 (S45).

The file system 114 then converts the logical address in the access command into a physical block, as explained with reference to FIG. 5 (S46). The access transmission unit 115 transmits the first access command after the conversion or the second access command after the conversion (can be also together referred to hereinbelow as the "post-conversion access command") to the storage device 2.

[Details of Processing Performed in Storage Device]

Where the post-conversion access command received from the information processing device 1 is the second access command after the conversion (YES in S51), the access management unit 215 in the storage device 2 updates the aggregate value on the basis of the physical block included in the received second access command after the conversion (S54).

Meanwhile, where the access command received from the information processing device 1 is not the second access command after the conversion (NO in S51), the access control unit 214 accesses the second data stored in the storage 220. In this case, the second access detection unit 213 detects the second state of access to the second data (S52). Further, the access control unit 214 transmits the accessed data to the application 111 that has requested the data access (S53). Then, the access count aggregate value is updated on the basis of the physical block included in the access command (S54). The access control unit 214 then rearranges the second data stored in the storage 220 on the basis of the access count aggregate value in the same manner as in the first embodiment (S55). It is necessary that the access management unit 215 could update the access count aggregate value with respect to both the first access command after the conversion and the second access command after the conversion (S54).

[Specific Example of Second Embodiment]

A specific example of the second embodiment is explained below. In the example depicted in FIG. 22, when the application 111 accesses the first data in the memory cache 120, the data access unit 112 issues the second access command to the file system 114 (S44 in FIG. 20). Similarly to the access command explained with reference to FIG. 5, the second access command in the example depicted in FIG. 22 has a file name indicating the file in the file system 114, a logical address, and the length of the data to be accessed. Further, the second access command in the example depicted in FIG. 22 also has, for example, an increment (also referred to hereinbelow as the "increment information") which is information relating to a number that is to be added by the access management unit 215 to the aggregate value. In the example depicted in FIG. 22, the file name in the second access command is D, the logical address is 32000 (32 KB), the data length is 50000 (50 KB), and the increment is 10. As a result of the second access command having an increment, the data access unit 112 can issue the second access command together with a plurality of first states of access. When the second access command is issued together with a plurality of first states of access, the data access unit 112 may have a counter for accumulating the first states of access.

The data access unit 112 can change the value to be set as the increment according to the degree of importance relating to the first data which are to be accessed. For example, the increment may be set to 100 or 200 to ensure that the first data accessed by the application 111 are necessarily stored in the SSD of the storage 220. Further, the data access unit 112 may issue a second access command that has no increment.

Then, the file system 114 converts the logical address included in the second access command issued by the data access unit 112 into a physical block. In the example depicted in FIG. 22, since the file name of the second access command is shown to be D, the conversion to the physical block is performed with reference to the correspondence table of the logical block of the file D stored in the file system 114 and the physical block (S46 in FIG. 20). The details of conversion from the logical address to the physical block have been explained with reference to FIG. 16, and the redundant explanation thereof is herein omitted.

In the example depicted in FIG. 22, the data length included in the access command is 50000 B (50 KB). Further, since the block size of each logical block is 32 KB, the data that are to be accessed by the application 111 are stored over two logical blocks. Further, the logical address included in the second access command is 32000. Therefore, the data that are to be accessed by the application 111 are stored in the logical block 1 and logical block 2. Further, the file system 114 completes the conversion from the logical address to the physical blocks by acquiring information of the block 4 and block 6, which are the physical blocks corresponding to the logical block 1 and logical block 2, by referring to the correspondence table of the physical blocks and logical blocks of the file D.

Then, the access transmission unit 115 transmits the post-conversion access command to the access reception unit 212 in the storage device 2 (S47 in FIG. 20). The post-conversion access command includes, for example, the physical block of the physical block acquired by the address conversion in S46 and the number of blocks. Further, when an increment is included in the second access command issued by the data access unit 112, the post-conversion access command may include the increment.

The access management unit 215 then increments, for example, by 10 the count of the block 4 and block 6 of the aggregate value, as indicated in FIG. 22, on the basis of the post-conversion access command (S54 in FIG. 21). By contrast with the case illustrated by FIG. 16, when the received post-conversion access command is the second access command after the conversion (the case illustrated by FIG. 22), the access control unit 214 does not access the storage 220.

Thus, the second access command in FIG. 22 is aimed at the notification of the storage device 2 of the fact that the first data in the memory cache 120 have been accessed, rather than at the access of the second data stored in the storage 220. Therefore, when the received access command is the second access command, the access control unit 214 accesses the storage 220. As a result, the access management unit 215 can reflect the information on the access that has took place in the memory cache 120 in the access count aggregate value, without accessing the storage 220.

When the storage position of the physical block which is to be accessed by the file system 114 is separated (the case in which the storage position is not sequential), the file system 114 may issue a plurality of post-conversion access commands to the storage device 2, as illustrated by FIG. 17.

Thus, according to the present embodiment, the data access unit 112 issues the second access command including the data which are to be accessed. As a result, the file system 114 that has received the second access command can convert the logical address of all data (all data in the memory cache 120 accessed by the application 111) indicated by the second access command into a physical block. Therefore, the access control unit 214 can cause the operation of the automatic hierarchization technique in a state reflecting the information relating to the data access by the application 111 to the memory cache 120.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing system comprising:
a storage device; and
an information processing device capable of accessing the storage device,
wherein the information processing device includes:
a data holding unit which holds first data that is read from the storage device;
a first detection unit which detects a first state of access, which indicates a number of times of access to the first data; and
a transmission unit which transmits the first state of access detected by the first detection unit to the storage device, and
wherein the storage device includes:
a storage unit which stores second data corresponding to the first data;
a reception unit which receives the first state of access transmitted from the transmission unit;
a second detection unit which detects a second state of access, which indicates a number of times of access to the second data; and
a control unit which rearranges the second data in the storage unit on the basis of an aggregate value of the number of times of access to the first data and the number of times of access to the second data.

2. The information processing system according to claim 1, wherein
the information processing device further comprises:
a data access unit which accesses, in response to a request for an access to the first data or the second data, the data holding unit when data to which the access is requested are included in the first data, and accesses the storage unit when data to which the access is requested are not included in the first data.

3. The information processing system according to claim 2, wherein
the storage device further comprises:
an access management unit which stores, for each unit area in the storage unit, an aggregate value of a second state of access to the second data stored in the unit area and a first state of access to the first data corresponding to the second data stored in the unit area, wherein
the access management unit updates an aggregate value of the unit area corresponding to the received first state of access when the reception unit receives the first state of access, and updates an aggregate value of the unit area corresponding to the detected second state of access when the second detection unit detects the second state of access; and
the control unit rearranges the second data on the basis of the aggregate value of each unit area.

4. The information processing system according to claim 3, wherein
the control unit rearranges the second data between a high-speed area and a low-speed area in the storage unit.

5. The information processing system according to claim 3, wherein
the information processing device further comprises:
an address conversion unit which converts a logical address of the second data to a physical address indicating the unit area where the second data have been stored,
when an access to the first data is detected by the first detection unit, the data access unit issues a first access command for accessing the second data corresponding to the first data for which the access has been detected;
the address conversion unit converts a logical address of the second data included in the first access command into the physical address;
the transmission unit transmits the first access command including the converted physical address; and
the control unit updates the aggregate value of the unit area by updating the aggregate value of the unit area indicated by the physical address included in the access command received by the reception unit.

6. The information processing system according to claim 5, wherein
the data access unit issues the first access command by setting a data length in the logical address to 0 bytes; and
the control unit updates the state of access to the unit area, without executing the access to the second data, when the data length of the access command received by the reception means is 0 bytes.

7. The information processing system according to claim 5, wherein
the address conversion unit performs the conversion to the physical address with respect to all positions from a storage position of the second data in a file including the second data to a final position of the file.

8. The information processing system according to claim 3, wherein
the information processing device further comprises:
an address conversion unit which converts a logical address of the second data to a physical address indicating the unit area where the second data have been stored,
when an access to the first data is detected by the first detection unit, the data access unit issues a second access command for accessing the second data corresponding to the first data for which the access has been detected;
the address conversion unit converts a logical address of the second data included in the second access command into the physical address;
the transmission unit transmits the second access command including the converted physical address; and
the control unit updates the aggregate value of the unit area by updating the aggregate value of the unit area indicated by the physical address included in the second access command received by the reception unit, without executing the access to the second data, when the second access command including the converted physical address is transmitted from the transmission unit.

9. The information processing system according to claim 8, wherein
the transmission unit issues the second access command by including increment information, which is the number of times the access to the first data has been detected by the first detection unit; and
the control unit updates the state of access to the unit area on the basis of the increment information.

10. The information processing system according to claim 9, wherein
the transmission unit changes the increment information according to a degree of importance of the first data for which the access has been detected by the first detection unit.

11. An information processing device comprising:
a data holding unit which holds first data that is read from a storage device;
a first detection unit which detects a first state of access, which indicates a number of times of access to the first data; and
a transmission unit which transmits the first state of access, which is detected by the first detection unit, to the storage device so that the storage device rearranges second data in a storage unit of the storage device on the basis of an aggregate value of the number of times of access to the first data and a second state of access which indicates a number of times of access to the second data,
wherein the second data correspond to the first data and is stored in the storage unit.

12. Non-transitory computer-readable storage medium storing an information processing program for causing a computer to execute a process, the process comprising:
holding the first data that is read from a storage device;
detecting a first state of access, which indicates a number of times of access to the first data; and
transmitting the first state of access, which is detected by the first detection unit, to the storage device so that the storage device rearranges second data in a storage unit of the storage device on the basis of an aggregate value of the number of times of access to the first data and a second state of access, which indicates a number of times of access to the second data,
wherein the second data correspond to the first data and are stored in the storage unit.

13. The information processing system according to claim 1, wherein
the first state of access is the number of accesses to the first data, and the second state of access is the number of accesses to the second data.

* * * * *